US010768282B2

(12) United States Patent
Crouch et al.

(10) Patent No.: US 10,768,282 B2
(45) Date of Patent: Sep. 8, 2020

(54) METHOD AND SYSTEM FOR LASER PHASE TRACKING FOR INTERNAL REFLECTION SUBTRACTION IN PHASE-ENCODED LIDAR

(71) Applicant: BLACKMORE SENSORS & ANALYTICS, LLC, Palo Alto, CA (US)

(72) Inventors: Stephen C. Crouch, Bozeman, MT (US); Emil Kadlec, Bozeman, MT (US); Krishna Rupavatharam, Bozeman, MT (US)

(73) Assignee: BLACKMORE SENSORS & ANALYTICS, LLC, Palo, Alto, CA (US)

( * ) Notice: Subject to any disclaimer, the term of this patent is extended or adjusted under 35 U.S.C. 154(b) by 0 days.

(21) Appl. No.: 16/681,663

(22) Filed: Nov. 12, 2019

(65) Prior Publication Data
US 2020/0150251 A1 May 14, 2020

Related U.S. Application Data

(60) Provisional application No. 62/783,749, filed on Dec. 21, 2018, provisional application No. 62/760,437, filed on Nov. 13, 2018.

(51) Int. Cl.
*G01C 3/08* (2006.01)
*G01S 7/4915* (2020.01)
(Continued)

(52) U.S. Cl.
CPC .......... *G01S 7/4915* (2013.01); *G01S 7/4814* (2013.01); *G01S 7/4816* (2013.01); *G01S 7/4914* (2013.01); *G01S 17/36* (2013.01)

(58) Field of Classification Search
CPC .... G01S 7/4915; G01S 7/4814; G01S 7/4816; G01S 7/4914; G01S 17/36
See application file for complete search history.

(56) References Cited

U.S. PATENT DOCUMENTS

| 2003/0133093 | A1  | 7/2003 | Asaka et al. |
| 2018/0224547 | A1* | 8/2018 | Crouch .................. G01S 17/58 |
| 2019/0011558 | A1* | 1/2019 | Crouch .................. G08G 1/165 |

FOREIGN PATENT DOCUMENTS

| WO | WO-2018/091970    | 5/2018 |
| WO | WO-2018/144853 A1 | 8/2018 |
| WO | WO-2019/014177 A1 | 1/2019 |

OTHER PUBLICATIONS

Loayssa, A., et al. "Optical Single-Sideband Modulators and Their Applications," Fiber and Integrated Optics, 23:2-3, 171-188 (2004).
(Continued)

*Primary Examiner* — Samantha K Abraham
(74) *Attorney, Agent, or Firm* — Foley & Lardner LLP

(57) ABSTRACT

A system and method for optical detection in autonomous vehicles includes modulating an optical signal from a laser to generate a modulated optical signal and transmitting the modulated optical signal toward an object. The system and method include receiving, responsive to transmitting the modulated optical signal, a returned optical signal and mixing the returned optical signal with a reference optical signal associated with the optical signal from the laser to generate a mixed optical signal and detecting the mixed optical signal to generate an electrical signal. Based on the electrical signal and the modulated optical signal, a parameter of an internal reflection of the returned optical signal from one or more optical components is determined, which may be used to operate a vehicle.

20 Claims, 24 Drawing Sheets

(51) Int. Cl.
*G01S 7/481* (2006.01)
*G01S 7/4914* (2020.01)
*G01S 17/36* (2006.01)

(56) References Cited

OTHER PUBLICATIONS

Shimotsu, S., et al. "Single side-band modulation performance of a LiNbO 3 integrated modulator consisting of four-phase modulator waveguides." IEEE Photonics Technology Letters 13.4 (2001): 364-366.
International Search Report and Written Opinion regarding International Appl. No. PCT/US2019/061022, dated Apr. 1, 2020, 13 pps.

* cited by examiner

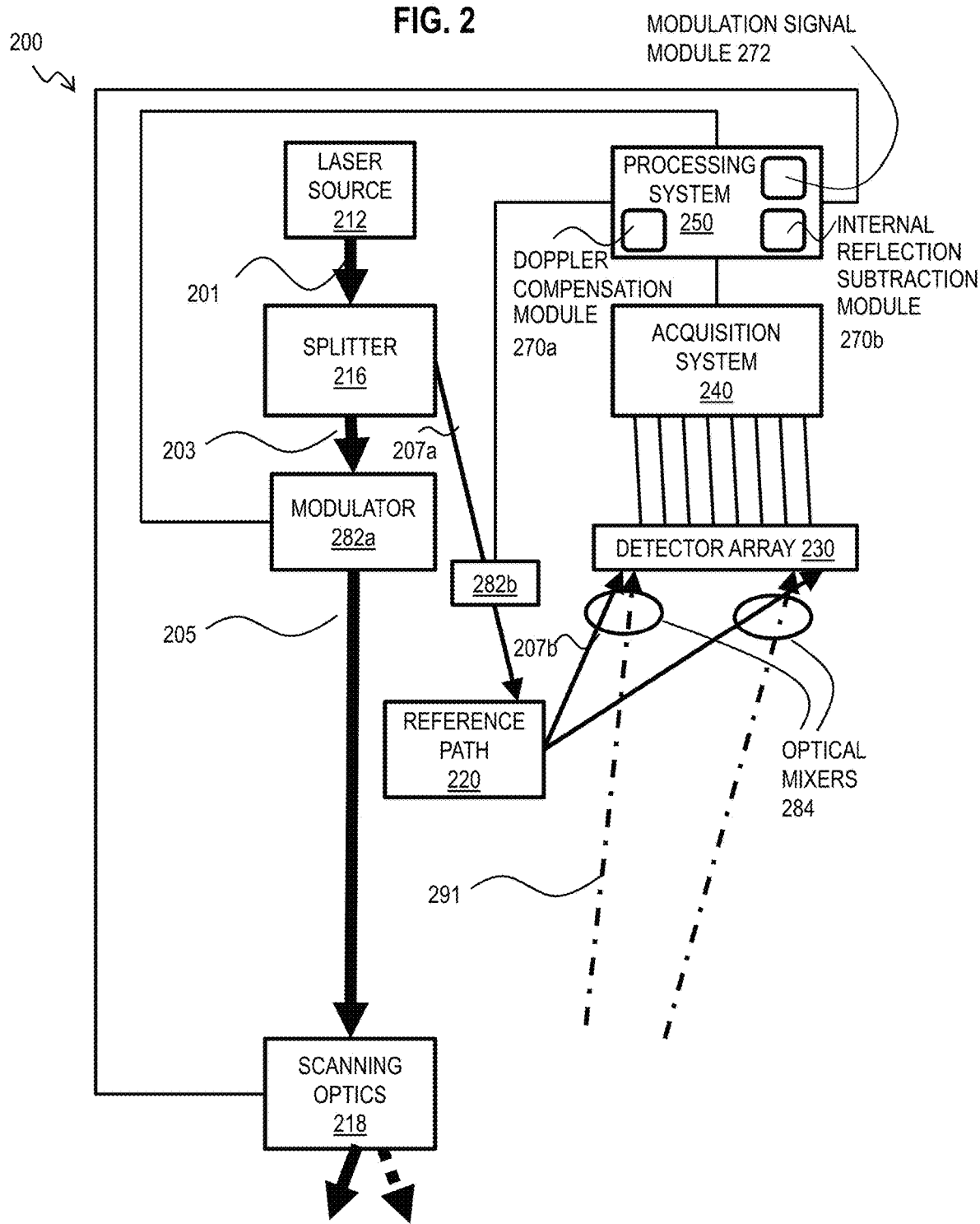

Range Bins

METHOD AND SYSTEM FOR LASER PHASE TRACKING FOR INTERNAL REFLECTION SUBTRACTION IN PHASE-ENCODED LIDAR

CROSS-REFERENCE TO RELATED APPLICATIONS

This application claims the benefit of and priority to U.S. Provisional Patent Application No. 62/760,437, filed Nov. 13, 2018. This application also claims the benefit of and priority to U.S. Provisional Patent Application No. 62/783,749, filed Dec. 21, 2018. The entire disclosures of U.S. Provisional Patent Application No. 62/760,437 and U.S. Provisional Patent Application No. 62/783,749 are incorporated herein by reference in their entireties.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and methods for Doppler compensation and internal reflection subtraction in the operation of an autonomous vehicle.

One embodiment disclosed herein is directed to a system for internal reflection subtraction. In some embodiments, the system includes a laser source that provides an optical signal. In some embodiments, the system includes a modulator that modulates the optical signal from the laser to generate a modulated optical signal. In some embodiments, the system includes an optical coupler that generates a reference optical signal associated with the optical signal from the laser, transmits the modulated optical signal toward an object, and receives a returned optical signal responsive to transmitting the modulated optical signal toward the object. In some embodiments, the system includes an optical mixer that mixes the returned optical signal with the reference optical signal to generate a mixed optical signal, wherein the reference optical signal is associated with the optical signal from the laser. In some embodiments, the system includes an optical detector that detects the mixed optical signal to generate an electrical signal. In some embodiments, the system includes a processor that determines a parameter of an internal reflection of the returned optical signal from one or more optical components based on the electrical signal and the modulated optical signal, and operates a vehicle based on the parameter of the internal reflection.

In another aspect, the present disclosure is directed to a method for internal reflection subtraction. The method includes modulating an optical signal from a laser to generate a modulated optical signal. In some embodiments, the method includes transmitting the modulated optical signal toward an object. In some embodiments, the method includes receiving, responsive to transmitting the modulated optical signal, a returned optical signal. In some embodiments, the method includes mixing the returned optical signal with a reference optical signal associated with the optical signal from the laser to generate a mixed optical signal. In some embodiments, the method includes detecting the mixed optical signal to generate an electrical signal. In some embodiments, the method includes determining, based on the electrical signal and the modulated optical signal, a parameter of an internal reflection of the returned optical signal from one or more optical components. In some embodiments, the method includes operating, based on the parameter of the internal reflection, a vehicle.

In another aspect, the present disclosure is directed to a system for Doppler compensation. In some embodiments, the system includes a laser source that provides an optical signal at a carrier frequency. In some embodiments, the system includes a phase modulator. In some embodiments, the system includes an optical mixer. In some embodiments, the system includes a first optical detector. In some embodiments, the system includes a processor that controls the phase modulator to produce an optical output signal that comprises an optical broadband phase-encoded optical signal. In some embodiments, the processor receives a real part of a mixed optical signal from the first optical detector as a result of receiving a returned optical signal and mixing the returned optical signal with a reference optical signal. In some embodiments, either the output optical signal or the reference optical signal includes a pilot tone having a pilot frequency that is offset a known signed non-zero frequency from the carrier frequency. In some embodiments, the processor determines a peak frequency of the returned optical signal based, at least in part, on a Fourier transform of a digital signal comprising the real part of the mixed optical signal. In some embodiments, the processor determines a signed Doppler frequency shift of the returned optical signal based on the peak frequency and the pilot frequency. In some embodiments, the processor operates a device based on the signed Doppler frequency shift.

In another aspect, the present disclosure is directed to a method for Doppler compensation. In some embodiments, the method includes producing an optical output signal by phase modulation of an optical signal at a carrier frequency from a laser with a broadband RF phase-encoded signal. In some embodiments, the output optical signal includes an optical broadband phase-encoded optical signal. In some embodiments, the method includes transmitting the output optical signal. In some embodiments, the method includes receiving a returned optical signal in response to transmitting the output optical signal. In some embodiments, the method includes producing a mixed optical signal by mixing the returned optical signal with a reference optical signal, wherein either the output optical signal or the reference optical signal includes a pilot tone having a pilot frequency that is offset a known signed non-zero frequency from the carrier frequency. In some embodiments, the method includes detecting a real part of the mixed optical signal at a first optical detector. In some embodiments, the method includes determining on a processor a peak frequency of the returned optical signal based, at least in part, on a Fourier transform of a digital signal comprising the real part of the mixed optical signal. In some embodiments, the method includes determining on a processor a signed Doppler frequency shift of the returned optical signal based on the peak frequency and the pilot frequency. In some embodiments, the method includes operating a device based on the signed Doppler frequency shift.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. For example, any of the components discussed herein for Doppler compensation and/or internal reflection subtraction may be combined into a single embodiment that performs the operations and/or functionality of each of the components. Any of the operations for any methods, as discussed herein, of Doppler compensation and/or internal reflection subtraction may be combined into a single embodiment. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2 is a block diagram that illustrates example components of a high resolution LIDAR system, according to an embodiment;

DETAILED DESCRIPTION

Figure 1A:
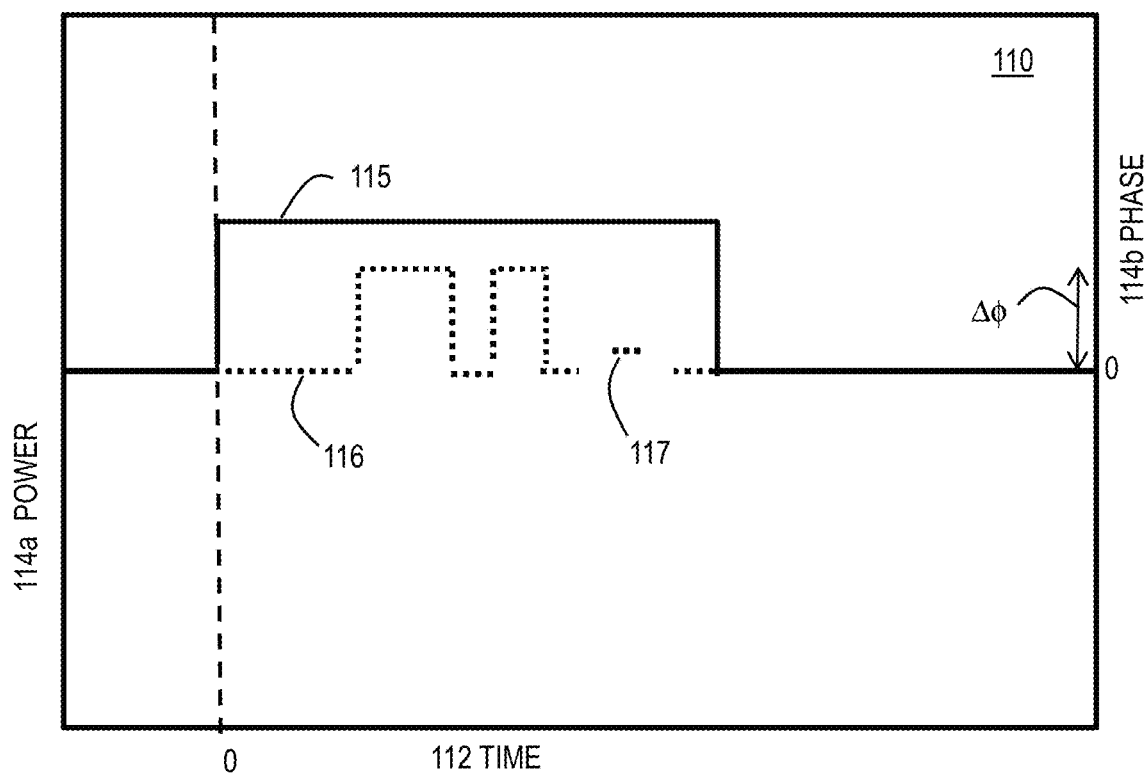
FIG. 1A is a schematic graph that illustrates an example transmitted optical phase-encoded signal for measurement of range, according to an embodiment.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

LIDAR detection with phase-encoded microwave signals modulated onto an optical carrier have been used as well. Here bandwidth B is proportional to the inverse of the duration r of the pulse that carries each phase ($B=1/\tau$), with any phase-encoded signal made up of a large number of such pulses. This technique relies on correlating a sequence of phases (or phase changes) of a particular frequency in a return signal with that in the transmitted signal. A time delay associated with a peak in correlation is related to range by the speed of light in the medium. Range resolution is proportional to the pulse width $\tau$. Advantages of this technique include the need for fewer components, and the use of mass produced hardware components developed for phase-encoded microwave and optical communications.

A variety of coherent ranging techniques have been demonstrated to provide single-shot range and Doppler information for moving targets. In both coded and chirped waveform design, the Doppler effect of a moving target must be understood and compensated in some way to allow accurate range measurements. In the coded case, Doppler compensation is vital prior to cross-correlation due a "thumb-tack" ambiguity function. Without this operation, a range measurement will be difficult or impossible to observe. Techniques have been proven to overcome these challenges. In prior work by inventors, techniques for Doppler shift detection and range correction based on the detected Doppler shift for phase-encoded LIDAR were presented and published as World Intellectual Property Organization (WIPO) Patent Cooperation Treaty (PCT) International Publication WO2018/144853 by Crouch et al. entitled "Method and System for Doppler Detection and Doppler Correction of Optical Phase-Encoded Range Detection" (hereinafter Crouch I) and PCT International application No. PCT/US2018/041388 by Crouch et al. entitled "Method and System for Time Separated Quadrature Detection of Doppler Effects in Optical Range Measurements" (hereinafter Crouch II), the entire contents of each of which are hereby incorporated by reference as if fully set forth herein.

However, phase-encoded LIDAR systems implementing the aforementioned approaches to signed Doppler detection often struggle with consistently resolving Doppler detection ambiguity. For this reason, there is a long-felt need in resolving detection ambiguity in a manner that improves the capability of a phase-encoded LIDAR system to compensate for Doppler Effects in optical range measurements.

Furthermore, the reflections (also referred to herein as, "internal reflections" or "internal optical reflections") from internal optical components associated with the phase-encoded LIDAR system (or any LIDAR system) often further degrades the measurement accuracy of the phase-encoded LIDAR system. For example, strong back-reflections from circulator optics can limit measurement dynamic range and obscure small target returns by increasing the noise floor (through unwanted sidelobe structure) above the shot noise. Conventional phase-encoded LIDAR systems use a technique called circulator subtraction to estimate the stationary signal (internal back-reflection) and digitally remove it, which has proven to be very effective way to observe weak non-stationary target signals.

However, circular subtraction requires a laser which is frequency stable (<π/10 phase drift) over several (>25) measurements, where one measurement corresponds to one transmitted optical signal (pulse or chirp or phase sequence) and one received optical signal (pulse or chirp or phase sequence) if any, received in response. Since such requirements are too burdensome and/or costly for many LIDAR applications (e.g., autonomous vehicles), there is also a long-felt need in providing alternate techniques and/or equipment configurations for mitigating (e.g., removing, subtracting) the internal reflections to improve the capability of a phase-encoded LIDAR system to perform optical range measurements.

Accordingly, the present disclosure is directed to systems and methods for compensating for the Doppler shift and the negative effects of any internal optical reflections of a returned signal from one or more internal optical components. That is, the present disclosure describes systems (e.g., a phase-encoded LIDAR system) and methods that add a non-carrier pilot tone to either an output optical signal or a reference optical signal such that the Doppler shift can be used to correct the cross-correlation calculation, which in turn, improves the system's capability to determine range. The system may further improve its capability to determine range by subtracting out (or removing) the internal reflections of the returned signal from the optical components.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Phase-encoded Detection Overview

FIG. 1A is a schematic graph 110 that illustrates an example transmitted optical phase-encoded signal for measurement of range, according to an embodiment. The horizontal axis 112 indicates time in arbitrary units from a start time at zero. The left vertical axis 114a indicates power in arbitrary units during a transmitted signal; and, the right vertical axis 114b indicates phase of the transmitted signal in arbitrary units. To most simply illustrate the technology of phase-encoded LIDAR, binary phase encoding is demonstrated. Trace 115 indicates the power relative to the left axis 114a and is constant during the transmitted signal and falls to zero outside the transmitted signal. Dotted trace 116 indicates phase of the signal relative to a continuous wave signal.

As can be seen, the trace is in phase with a carrier (phase=0) for part of the transmitted signal and then changes by $\Delta\phi$ (phase=$\Delta\phi$) for short time intervals, switching back and forth between the two phase values repeatedly over the transmitted signal as indicated by the ellipsis 117. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi^*\{0, 1, 2$ and $3\}$, which, for $\Delta\phi=\pi/2$ (90 degrees), equals $\{0, \pi/2, \pi$ and $3\pi/2\}$, respectively; and, thus 4 phase values can represent 0, 1, 2, 3, respectively. In this example, each symbol indicates the same amount of information as two bits and the bit rate is twice the baud rate.

Phase-shift keying (PSK) refers to a digital modulation scheme that conveys data by changing (modulating) the phase of a reference signal (the carrier wave) as illustrated in FIG. 1A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (thus, it is a non-coherent scheme).

For optical ranging applications, the carrier frequency is an optical frequency fc and a RF $f_0$ is modulated onto the optical carrier. The number N and duration τ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figure 1B:
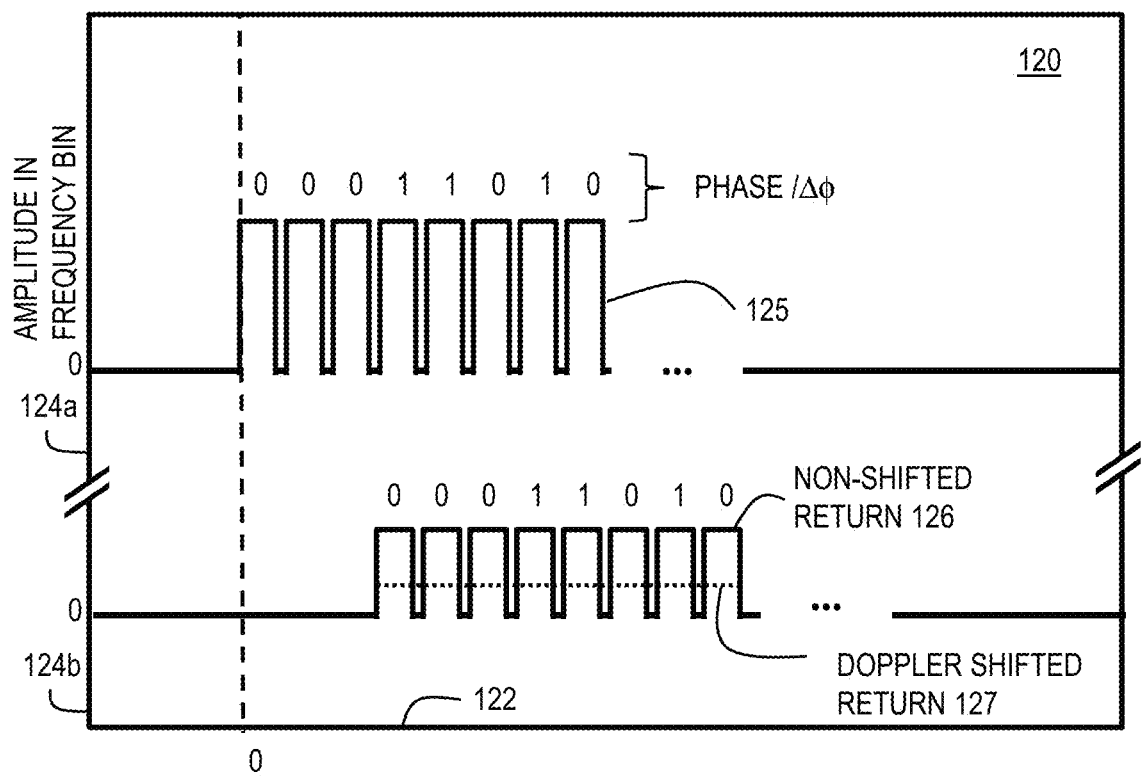
FIG. 1B is a schematic graph that illustrates the example transmitted signal of FIG. 1A as a series of binary digits along with returned optical signals for measurement of range, according to an embodiment.

FIG. 1B is a schematic graph 120 that illustrates the example transmitted signal of FIG. 1A as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency fc+$f_0$ in arbitrary units relative to zero. The vertical axis 124b indicates amplitude of an optical returned signal at frequency fc+$f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+$f_0$ and is not well detected in the expected frequency band, so the amplitude is highly diminished.

The observed frequency f' of the return differs from the correct frequency f=fc+$f_0$ of the return by the Doppler effect given by Equation 1.

$$f' = \frac{(c + v_o)}{(c + v_s)} f \quad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, Δf=f'-f, is the Doppler shift, $\Delta f_D$, which causes problems for the range measurement, and is given by Equation 2.

$$\Delta f_D = \left[\frac{(c + v_o)}{(c + v_s)} - 1\right] f \quad (2)$$

Note that the magnitude of the error increases with the frequency f of the signal. Note also that for a stationary LIDAR system ($v_o$=0), for an object moving at 10 meters a second ($v_s$=10), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

Figure 1C:
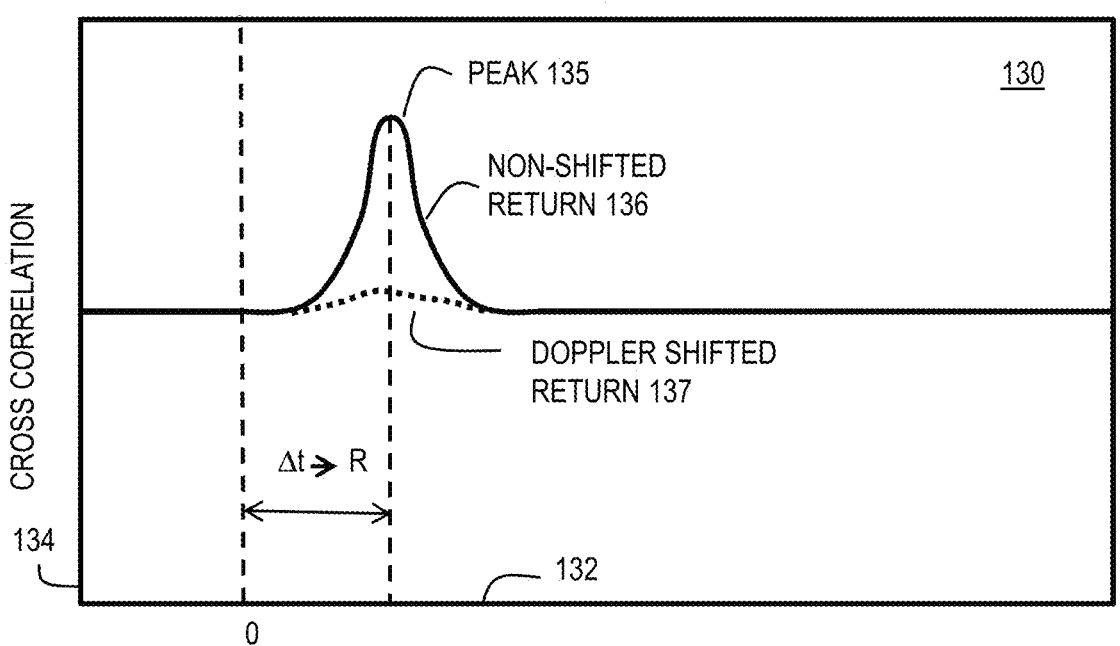
FIG. 1C is a schematic graph that illustrates example cross-correlations of a reference signal with two returned signals, according to an embodiment.

FIG. 1C is a schematic graph 130 that illustrates example cross-correlations of the transmitted signal with two returned signals, according to an embodiment. In phase coded ranging, the arrival of the phase coded reflection is detected in the return by cross correlating the transmitted signal or other reference signal with the returned signal, implemented practically by cross correlating the code for an RF signal with an electrical signal from an optical detector using heterodyne detection and thus down-mixing back to the RF band. The horizontal axis 132 indicates a lag time in arbitrary units applied to the coded signal before performing the cross-correlation calculation with the returned signal. The vertical axis 134 indicates amplitude of the cross-correlation computation. Cross-correlation for any one lag is computed by convolving the two traces, i.e., multiplying corresponding values in the two traces and summing over all points in the trace, and then repeating for each time lag. Alternatively, the cross-correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross-correlation computation is typically done with analog or digital electrical signals after the amplitude and phase of the return is detected at an optical detector. To move the signal at the optical detector to an RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 136 represents cross correlation with an idealized (noiseless) return signal that is reflected from an object that is not moving (and thus the return is not Doppler shifted). A peak occurs at a time Δt after the start of the transmitted signal. This indicates that the returned signal includes a version of the transmitted phase code beginning at the time Δt. The range R to the reflecting (or backscattering) object is computed from the two-way travel time delay based on the speed of light c in the medium, as given by Equation 3.

$$R = c*\Delta t/2 \quad (3)$$

Dotted trace 137 represents cross correlation with an idealized (noiseless) return signal that is scattered from an object that is moving (and thus the return is Doppler shifted). The return signal does not include the phase encoding in the proper frequency bin, the correlation stays low for all time lags, and a peak is not as readily detected, and is often undetectable in the presence of noise. Thus Δt is not as readily determined, and range R is not as readily produced.

2. Optical Detection Hardware Overview

In order to depict how an improved phase-encoded detection approach is implemented, some generic and specific hardware approaches are described. FIG. 2 is a block diagram that illustrates example components of a Doppler compensated LIDAR system, according to an embodiment. The LIDAR system 200 includes a laser source 212, a splitter 216, a modulator 282a, a reference path 220, scanning optics 218, a processing system 250, an acquisition system 240, and a detector array 230. The laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal. A target beam 205, also called transmitted signal or output optical signal herein, with most of the energy of the beam 201 is produced. A modulated or unmodulated reference beam 207a with a much smaller amount of energy that is nonetheless enough to produce good mixing with the returned beam 291 scattered from an object (not shown) is also produced. In the illustrated embodiment the reference beam 207a is separately modulated in modulator 282b; but, in some embodiments, modulator 282b is omitted. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR. In some embodiments, the reference beam 207b is called the local oscillator (LO) signal referring to older approaches that produced the reference beam 207b locally from a separate oscillator.

In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers to produce an optical signal of characteristics to be properly detected. The frequency, phase or amplitude of the interference pattern, or some combination, is recorded by acquisition system 240 for each detector at multiple times during the signal duration D. The number of temporal samples processed per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled as any digital record of the returned heterodyne signal or bits could be compared or cross correlated with any portion of transmitted bits from the prior transmission history.

The acquired data is made available to a processing system 250, such as a computer system described below with reference to FIG. 14, or a chip set described below with reference to FIG. 10. The processing system 250 includes a Doppler compensation module 270a and a phase tracking internal reflection subtraction module 270b (shown in FIG. 2 as an internal reflection subtraction module 270b). The Doppler compensation module 270a determines the sign and size of the Doppler shift and the corrected range based thereon along with any other corrections described herein. The internal reflection subtraction module 270b determines the phase tracked internal reflection correction used by the processing system 250 along with any other corrections known to provide a corrected range measurement (e.g., signals produced from Doppler compensation module 270a). In some embodiments, the data processing also provides estimates of Doppler shift in which the frequency of a return signal is shifted due to motion of the object. In some embodiments, the processing system 250 also provides scanning signals to drive the scanning optics 218, and includes a modulation signal module 272 to send one or more electrical signals that drive modulators 282a, 282b, as illustrated in FIG. 2.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

3. Phase Encoded Optical Detection

In some phase encoded embodiments, electro-optic modulators provide the modulation. The system is configured to produce a phase code of length M*N and symbol duration $\tau$, for a total duration of $D=M*N*\tau$, suitable for the down-range resolution desired, as described in more detail below for various embodiments. For example, in 3D imaging applications, the total number of pulses M*N is in a range from about 500 to about 4000. Because the processing is often done in the digital domain, it is advantageous to select M*N as a power of 2, e.g., in an interval from 512 to 4096. M is 1 when no averaging is done. If there are random noise contributions, then it is advantages for M to be about 10. As a result, N is in a range from 512 to 4096 for M=1 and in a range from about 50 to about 400 for M=10. For a 500 Mbps to 1 Gbps baud rate, the time duration of these codes is then between about 500 ns and 8 microseconds. It is noted that the range window can be made to extend to several kilometers under these conditions and that the Doppler resolution can also be quite high (depending on the duration of the transmitted signal). Although processes, equipment, and data structures are depicted in FIG. 2, and subsequent diagrams FIG. 3 and FIG. 5, as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, splitter 216 and reference path 220 include zero or more optical couplers.

4 Doppler Compensated LIDAR with Int. Reflection Subtraction

Figure 3:
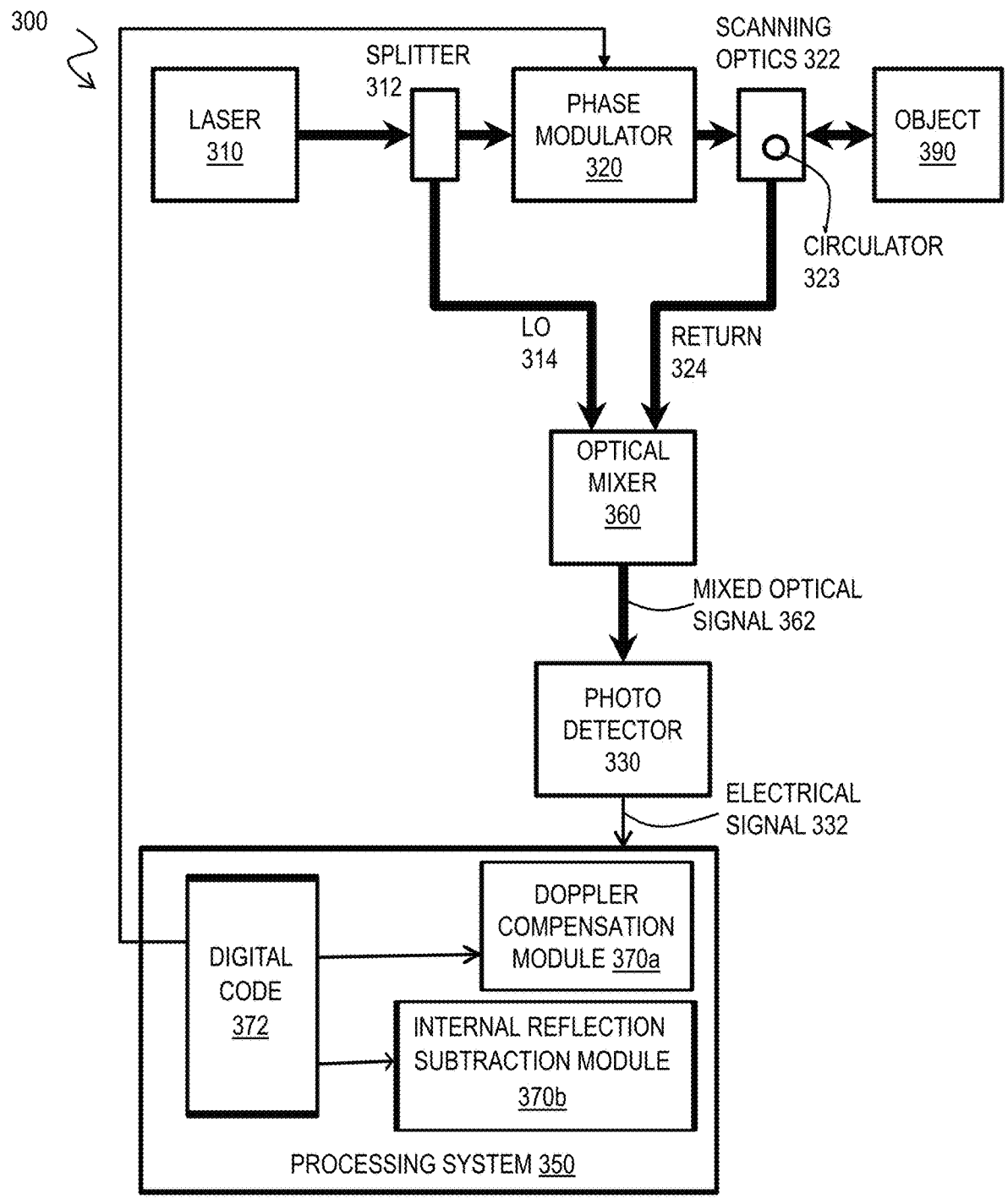
FIG. 3 is a block diagram that illustrates example components of a Doppler compensated phase-encoded LIDAR system using in-phase/quadrature (I/Q) processing, according to an embodiment.

FIG. 3 is a block diagram that illustrates example components of a phase-encoded LIDAR system using previous approaches. Although an object 390 is depicted to illustrate operation of the LIDAR system 300, the object 390 is not part of the LIDAR system 300. The system includes laser 310 and phase modulator 320, beam splitter 312, an optical mixer 360, such as a circulator and combiner, scanning optics 322 including transmission/receiver optics such as circulator 323, and a photodetector 330 (also referred to herein as, "optical detector 330"). The output of the beam splitter 312 is used as the local oscillator (LO) reference signal 314 (also referred to herein as, "LO 314") and input to optical mixer 360. The return optical signal 324 is output by circulator 323 in the scanning optics 322 and is sent to the optical mixer 360. The result is a mixed optical signal that is directed to the photodetector 330, which outputs an electrical signal 332 that is input to the processing system 350. The processing system 350 includes a digital code module 372 to generate the digital code used to drive the phase modulator 320. The processing system 350 also includes a Doppler compensation module 370a used to derive the signed Doppler shift based on the digital code and/or electrical signal 332. The processing system 350 also includes a phase tracking internal reflection subtraction module 370b for determining cross correlation and range based on the digital code and/or electrical signal 332.

In previous approaches the way to determine the sign of the Doppler shift was to process real and imaginary components of the mathematical representation of the signal separately. In embodiments described in more detail below, the use of single sideband phase modulation obviates the need for separate processing; but can be used with those systems as well.

In electrical engineering, a sinusoid with phase modulation (corresponding to an angle modulation between the real and imaginary parts of the mathematical function $\exp(i\omega t)$) can be decomposed into, or synthesized from, two amplitude-modulated sinusoids that are offset in phase by one-quarter cycle ($\pi/2$ radians). All three functions have the same frequency. The amplitude modulated sinusoids are known as in-phase component (I) at 0 phase and quadrature component (Q) at a phase of $\pi/2$.

A laser produces an optical signal at a carrier frequency fc. The modulated laser optical signal, L, is represented mathematically by Equation 4.

$$L = I_0 \exp(i\omega_c t) \quad (4)$$

where $I_0$ is the intensity output by the laser, $\exp(\ )$ is the exponential function such that $\exp(x)=e^x$, i is the imaginary number having the properties of the square root of $-1$, t is time, and $\omega_c = 2\pi f_C$ is the angular frequency corresponding to the carrier frequency $f_C$.

Mathematically this expression has a real part=$I_{0R} \cos(\omega t)$ and an imaginary part=$I_{0I} \sin(\omega t)$, where $I_{0R}$ is the real part of the intensity (in-phase) and $I_{0I}$ is the imaginary part. The phase of the oscillation is given by the angle between the real and imaginary parts. Thus, $L = I_{0R} \cos(\omega t) + i I_{0I} \sin(\omega t)$, and $I_0$ is the root of the sum of the squares of the real and imaginary parts, $I_0^2 = I_{0R}^2 + I_{0I}^2$. Splitter 312 directs a small portion of the intensity of the signal to use as a reference signal (called a local oscillator) LO given by Equation 5.

$$LO = A_{LO} \exp(i\omega t) = A_R \cos(\omega t) + i A_I \sin(\omega t). \quad (5a)$$

where A is a constant that represents the intensity effect of the beam splitter 312. The electric field, $E_{LO}$, that generally is detected at an optical detector that outputs an electrical signal, can thus be written as Equation 5b.

$$E_{LO} = A_{LO} e^{i\omega t} \quad (5b)$$

When the reference signal (LO) is the unmodulated laser signal, the entire signal is in phase and the imaginary component is zero, thus $$LO = A \cos(\omega t). \quad (5c)$$

In this embodiment, the modulation signal module in the processing system sends an electrical signal that indicates a digital code of symbols to be imposed as phase changes on the optical carrier, represented as B(t) where B(t) switches between 0 and $\pi/2$ as a function of t. The phase modulator 320 acting as modulator 282a imposes the phase changes on the optical carrier by taking digital lines out of a field programmable gate array (FPGA), amplifying them, and driving the EO phase modulator. The transmitted optical signal, T, is then given by Equation 6a.

$$T = C\{R \exp(i[\omega t]) + S \exp(i[\omega t + B(t)])\} \quad (6a)$$

where C is a constant that accounts for the reduction in $I_0$ by splitting of the fraction A and any amplification or further reduction imposed by the phase modulator 320 or other components of the transmitted path, R is the amplitude of the residual carrier after phase modulation and S is the amplitude for the phase coded signal. Here $\omega = 2\pi f_0$ is the angular frequency corresponding to the frequency $f_0$ of any pilot tone in the spectrum that is useful for detecting a Doppler shift. In previous approaches using dual sideband modulation, this peak is at the carrier frequency $f_C$, $f_0 = f_C$. These are the zeroth and first order sidebands of the dual sideband phase modulator; and, the phase of the argument $\omega t$ is always related for both the carrier and phase code parts of the signal.

In various embodiments using the current techniques, this pilot peak useful for Doppler detection is not at the carrier frequency, i.e., $f_0 \neq f_C$; but, instead, at a non-carrier pilot tone $f_P$, e.g., $f_0 = f_P$; and $\omega_P = 2\pi f_P$. The pilot peak is a single tone a known signed offset from the carrier frequency; and, is called a non-carrier (NC) pilot tone with a known pilot frequency $f_P$. Then Equation 6a is replaced with Equation 6b.

$$T = C\{P \exp(i[\omega_P t]) + S \exp(i[\omega_C t + B(t)])\} \quad (6b)$$

Where P is the amplitude of the non-carrier pilot signal and $\omega_c$ is the frequency at the center of the code, which, in some embodiments, is still at the carrier frequency and, in other embodiments using a single sideband phase modulator, is at a different frequency. In some embodiments, the NC pilot tone is added to the reference optical signal instead of the output optical signal that is transmitted, as described in more detail below.

The returned signal is directed to an optical mixer, where the return optical signal is mixed with the reference optical signal (LO) given by Equation 5a through Equation 5c. The returned signal R from the kth object intercepted by the transmitted beam is given by Equation 7a for the carrier pilot tone $f_0 = f_C$.

$$R_k = A_k \exp(i[(\omega + \omega_{Dk})(t + \Delta t_k) + B(t + \Delta t_k)]) \quad (7a)$$

where $A_k$ is a constant accounting for the loss of intensity due to propagation to and from the object and scattering at the kth object, $\Delta t_k$ is the two way travel time between the LIDAR system and the kth object, and $\omega_{Dk} = 2\pi \Delta f_D$ is the angular frequency of the Doppler frequency shift (called Doppler shift herein for convenience) of the kth object. The electric field of the return signal, $E_R$, summed over all targets, is then given by Equation 7b.

$$E_R = \sum_k A_k e^{i[\omega(t+\Delta t_k)+\omega_{D_k}(t+\Delta t_k)+B(t+\Delta t_k)]} \quad (7b)$$

For the non-carrier pilot tone and single sideband code, the return is expressed by Equation 7c and the Electric field by Equation 7d.

$$R_k = A_k\{P\exp(i[\omega_P + \omega_{Dk})(t + \Delta t_k)] + \quad (7c)$$
$$S\exp(i[(\omega_C + \omega_{Dk})(t + \Delta t_k) + B(t + \Delta t_k)])$$

$$E_R = \quad (7d)$$
$$\sum_k PA_k e^{i[\omega_P(t+\Delta t_k)+\omega_{D_k}(t+\Delta t_k)]} + SA_k e^{i[\omega_C(t+\Delta t_k)+\omega_{D_k}(t+\Delta t_k)+B(t+\Delta t_k)]}$$

The coincident signals (e.g., LO 314 and return optical signal 324) at the optical mixer 360 produce a mixed optical signal 362 with a beat frequency related to a difference in frequency and phase and amplitude of the two optical signals being mixed, and an output depending on the function of the optical mixer 360. As used herein, down mixing refers to optical heterodyne detection, which is the implementation of heterodyne detection principle using a nonlinear optical process. In optical heterodyne detection, called "down-mixing" herein, an optical signal of interest at some optical frequency is non-linearly mixed with a reference "local oscillator" (LO) that is set at a close-by frequency. The desired outcome is a difference frequency, which carries the information (amplitude, phase, and frequency modulation differences) of the original optical frequency signal, but which is oscillating at a lower more easily processed frequency, called a beat frequency herein, conveniently in the RF band. In some embodiments, this beat frequency is in an RF band that can be output from the optical detector 330 as an electrical signal 332, such as an electrical analog signal that can be easily digitized by RF analog to digital converters (ADCs). The electrical signal 332 is input to the processing system 350 and used, along with the digital code from the digital code module 372, by the Doppler compensation module 370a to determine cross correlation and range, and, in some embodiments, the signed Doppler shift and resulting speed and direction of the object. In some embodiments, the electrical signal 332 is input to the processing system 350 and used, along with the digital code from the digital code module 372, by the phase tracking internal reflection subtraction module 370b so that the processing system 350 can determine cross correlation and range.

In some embodiments, the raw signals are processed to find the Doppler peak and that frequency, $\omega_D$, is used to correct the correlation computation and determine the correct range. However, in such embodiments, the lack of I/Q detection will lead to a real valued time domain signal at the Doppler shift frequency at both positive and negative Doppler shifts. Analysis of this signal will not reveal the sign of the Doppler shift. In other embodiments, it was discovered to be advantageous if the optical mixer and processing are configured to determine the in-phase and quadrature components, and to use that separation to first estimate $\omega_D$ and then use $\omega_D$ to correct the cross correlation computation to derive $\Delta t$. The value of $\omega_D$ is also used to present the speed of the object. The value of $\Delta t$ is then used to determine and present the range to the object using Equation 3 described above. The separation of the I and Q signals by the optical mixers enable clearly determining the sign of the Doppler shift, as described in international patent application PCT/US2018/016632 published on 9 Aug. 2018 as WO 2018/144853, the entire contents of which are hereby incorporated by reference as if fully set forth herein.

4.1 Doppler Compensated LIDAR—Spectrum of a Doppler Shifted Return Signal

Figure 4A:
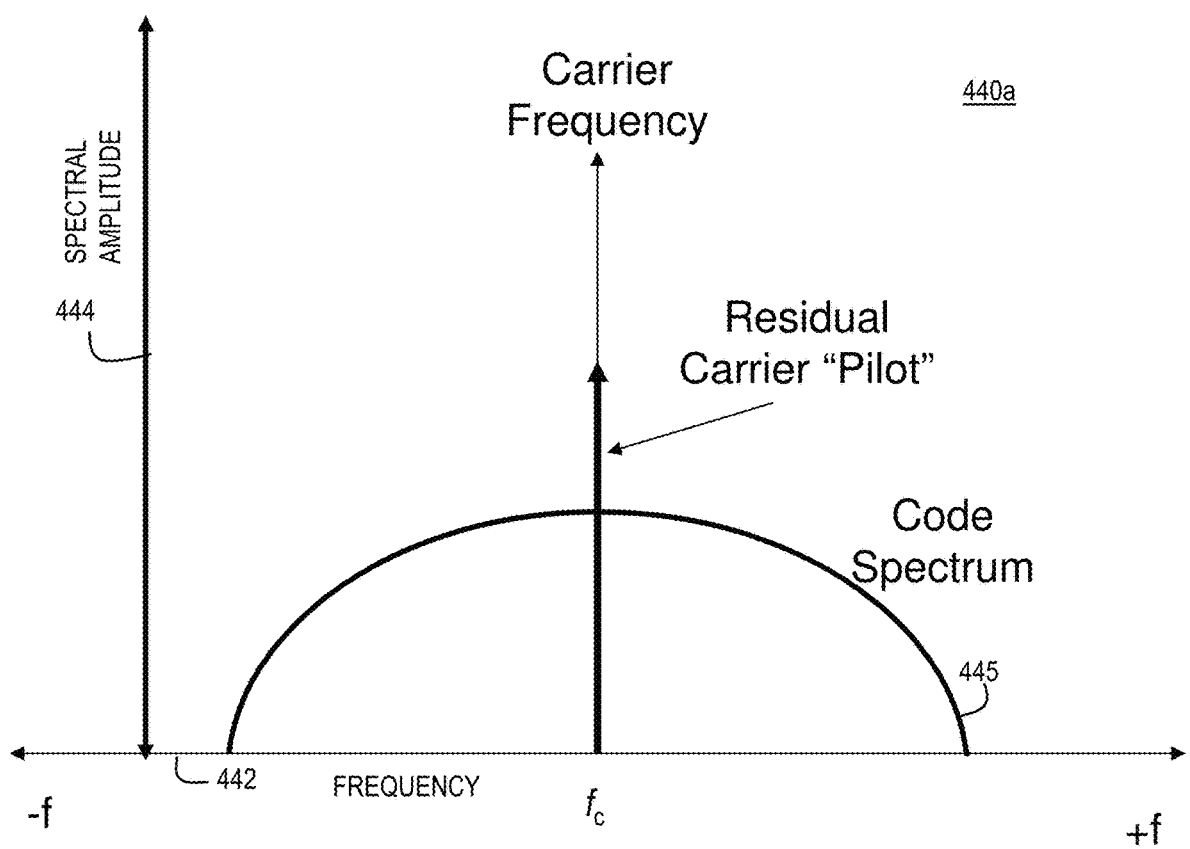
FIG. 4A is a schematic graph that illustrates an example spectrum of the output optical signal, according to an embodiment.
Figure 4B:
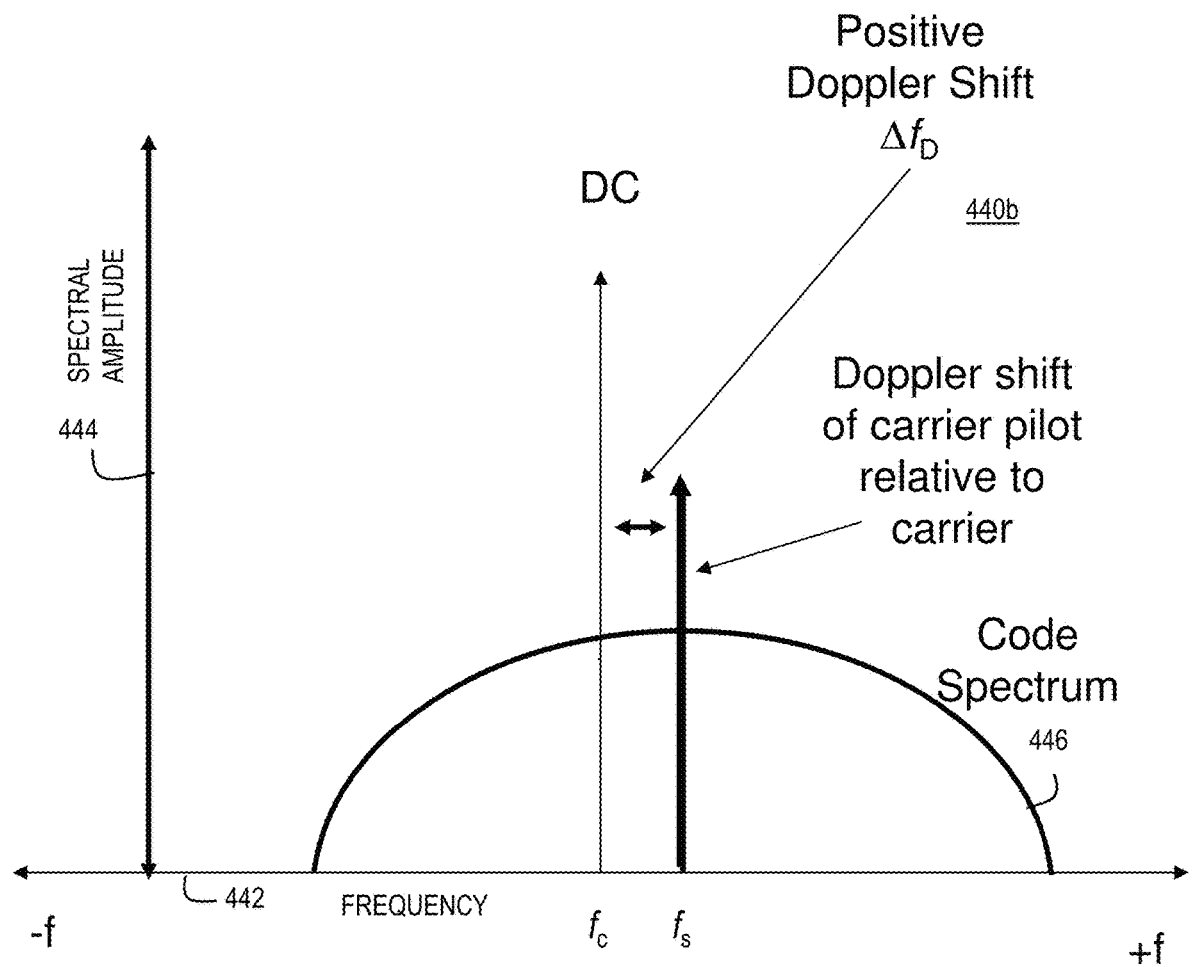
FIG. 4B is a schematic graph that illustrates an example spectrum of a Doppler shifted optical return signal when IQ processing is done, according to an embodiment.

FIG. 4A is a schematic graph 140a that illustrates an example spectrum of the transmitted signal; and FIG. 4B is a schematic graph 440a that illustrates an example spectrum of a Doppler shifted complex return signal. The horizontal axis 442 indicates RF frequency offset from an optical carrier fc in arbitrary units. The vertical axis 444 indicates amplitude of a particular narrow frequency bin, also called spectral density, in arbitrary units relative to zero. A typical phase modulator adds the RF phase modulation signal to both sides of the carrier frequency, $f_c$. This is called dual sideband modulation. Trace 445 represents a transmitted signal with RF $f_0=0$ (an electric field with frequency zero is also called a direct current, DC) which corresponds to $f_c$, as is the typical phase encoded implementation. Even though the modulation depresses the optical carrier frequency, $f_c$, there is still a residual spike in spectral density at that frequency. That spike dominates the power spectrum and is used to detect a Doppler shift, as will be demonstrated next. That residual carrier spike is called herein the carrier "pilot," because it guides the Doppler shift detection.

In FIG. 4B, trace 446 represents an idealized (noiseless) complex return signal that is backscattered from an object that is moving toward the LIDAR system and is therefore Doppler shifted to a higher frequency (called blue shifted). The return does not have a peak at the proper RF $f_0=0$ (DC); but, instead, is blue shifted by $\Delta f_D$ to a shifted frequency $f_S$. When the time domain signal is sampled with an IQ technique, then the sign of the Doppler shift (positive or negative relative to DC) is evident in the resulting power spectrum.

In other embodiments, described in Crouch I, it was discovered to be advantageous if the optical mixer and processing are configured to determine the in-phase (I) and quadrature (Q) components. IQ detection by one or more components (e.g., optical mixer 360 in FIG. 3) can be utilized to resolve the sign of the Doppler shift.

In example hardware embodiments described in Crouch I, a 90 degree optical hybrid optical mixer allows for I/Q detection of the optically down-mixed signals on two channels which are then digitized. This system allows for an extremely flexible "software defined" measurement architecture to occur. Other hardware embodiments described in Crouch I include the use of 3×3s multimode interference (MMI) structures. These devices are more compact than free-space 90-degree hybrids. They produce a 120 degree phase shift at each output port. Each port is then independently detected and digitized prior to software based reconstruction of the complex signal. The approach requires at least two detectors and two analog to digital converters (ADCs) to support a measurement. This presents a challenge to scaling where optical hybrids, detectors, electrical routing, and digitizers all take space in heavily integrated designs.

In other embodiments, described in Crouch II, an advantage is obtained if the in-phase (I) and quadrature (Q) components are detected at separate times. The reference signal can be made to be in-phase with the transmitted signal during one time interval to measure at an optical detector 330 an electrical signal related to the real part of the returned optical signal, and the reference signal can be made to be in quadrature with the transmitted signal during a different, non-overlapping time interval to measure at the optical detector 330 an electrical signal related to the complex part of the returned optical signal. A complex signal can then be generated digitally in Doppler compensation module 370a from the two measured electrical signals; and, the digitally constructed complex signal can be used to determine the properly signed Doppler shift.

In these embodiments, the I/Q separation was used to first estimate signed $\omega_D$ and then the signed $\omega_D$ was used to correct the cross-correlation computation to derive $\Delta t$. The estimate should be within the frequency resolution of the system set by the duration of processing interval. The Doppler shifted, time delayed code term (after down-mixing) for electric field due to kth return is given by Equation 7e, $$E_{RK} = A_k e^{i[\omega(\Delta t_k) + \omega_{D_k}(t+\Delta t_k) + B(t+\Delta t_k)]} \quad (7e)$$

The correction with the Doppler estimate, $\omega_{D_k}$, is achieved by a vector multiplication in the time domain (or the CIRCSHIFT method in the frequency domain). The vector multiplication is depicted in Equation 7f.

$$\begin{aligned} E_{Rk} &= A_k e^{i[\omega(\Delta t_k) + \omega_{D_k}(t+\Delta t_k) + B(t+\Delta t_k)]} * e^{-i[\omega_{D_k}(t)]} \\ &= A_k e^{i[\omega(\Delta t_k) + \omega_{D_k}(\Delta t_k) + B(t+\Delta t_k)]} \end{aligned} \quad (7f)$$

In Equation 7f one can see residual phase terms remains but the oscillating Doppler component of the argument is removed (compensated out).

The signed value of $\omega_D$ is also used to present the speed and direction of the object, at least on the vector connecting the object to the LIDAR system 300. The value of $\Delta t$ is then used to determine and present the range to the object using Equation 3 described above. The separation of the I and Q signals by the optical mixers enables clearly determining the sign of the Doppler shift. In some of these Doppler compensation embodiments with I and Q components determined separately, rather than finding $\Delta f_D$ by taking the spectrum of both transmitted and returned signals and searching for peaks in each, then subtracting the frequencies of corresponding peaks, it is more efficient to take the cross spectrum of the in-phase and quadrature component of the down-mixed returned signal in the RF band.

Figure 4C:
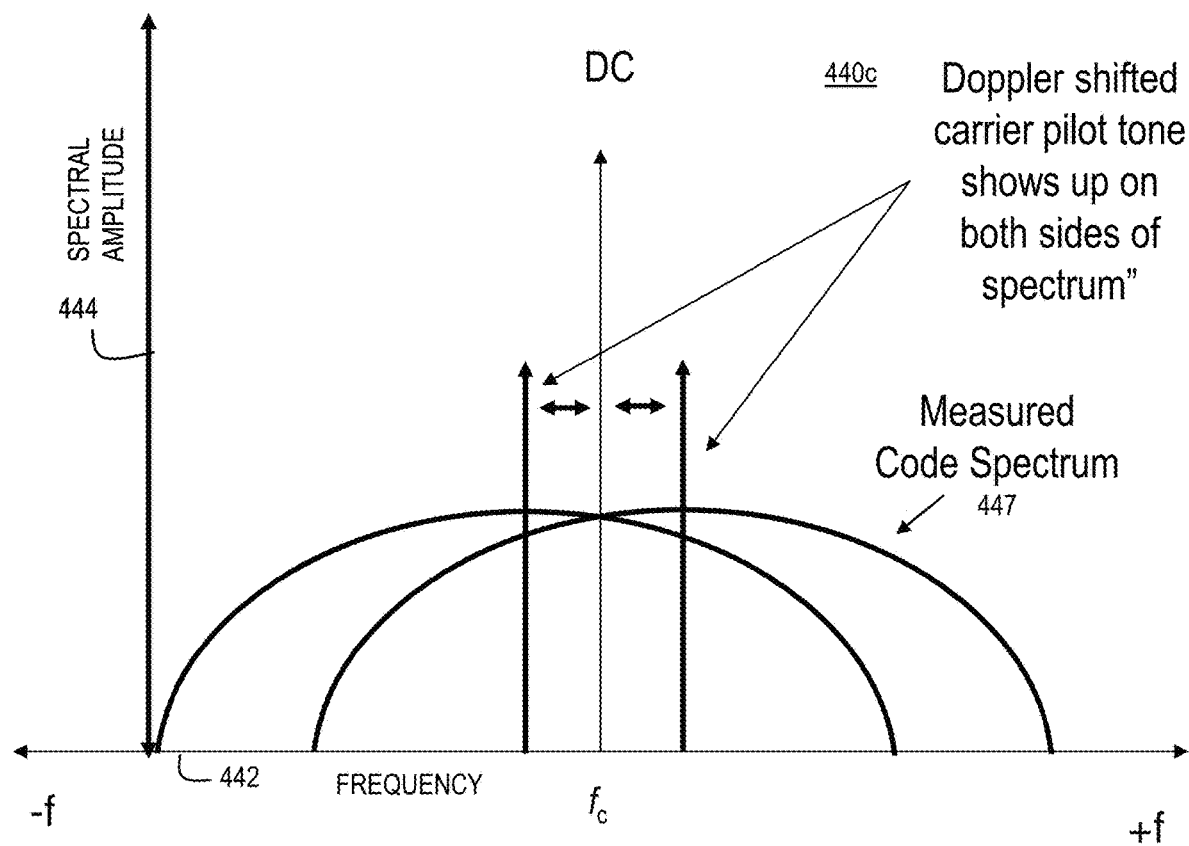
FIG. 4C is a schematic plot that illustrates an example spectrum of a Doppler shifted optical return signal when IQ processing is not done, according to an embodiment.

In practice, a complex return representing both in-phase and quadrature (I/Q) components of the return is often not measured, and the spectrum of the real valued return has peaks at both $+\Delta f_D$ and $-\Delta f_D$, thus the direction of the Doppler shift, and the direction of motion of the target, is not apparent from a single return. FIG. 4C is a schematic plot that illustrates an example return signal spectrum when IQ processing is not done, according to an embodiment. When only the real part of the mixed optical signal is sampled (non-IQ detection) then the resulting power spectrum will look like the sum of these two traces. The carrier pilot is seen on both sides of the spectrum. The Doppler shifted carrier pilot tone is evident and can be corrected prior to the correlation operation for the range measurement, but the sign is not recoverable as the peak shows up on both sides of the spectrum, symmetric about DC (RF $f_0$=RF $f_C$=0).

In all the above cases, the methods utilize electro optic phase modulators to drive dual sideband waveforms. With such modulators, modulation depth is chosen to maintain some energy in the carrier frequency. The residual carrier acts as a "pilot" tone in the transmitted waveform. When this CW "pilot" is Doppler shifted, the result is a beat note that can be used to estimate the Doppler shift from a target. The estimation of Doppler on the basis of this pilot tone allows for an efficient Doppler correction of the code signal prior to cross-correlation with a reference code—a two stage, Doppler then range, estimation process. Electro-optic modulation architectures beyond basic phase modulators are common in optical fiber communications.

A common architecture (see Shimotsu or Laoyssa references) allows the realization of single-sideband suppressed carrier (SSBSC) phase modulation. In the new embodiments presented here, the NC pilot tone is moved away from the carrier frequency (RF $f_0 \neq 0$) and does not map to fc. In some embodiments, this is achieved using single sideband modulation to produce the non-carrier pilot or the phase encoded signal or both; and a non-carrier pilot tone is introduced That is, in some embodiments, the transmitted (optical output) signal is produced by single sideband (SSB) modulation of an optical signal at a carrier frequency from a laser with a broadband RF phase-encoded signal, wherein the output optical signal includes an optical broadband phase-encoded optical signal on a single side of the carrier frequency and a pilot tone at a frequency within the optical broadband.

With proper waveform design, these SSBSC phase modulators can be used to generate pilot tones at frequencies other than the carrier frequency, which allows for non-base band centered operation of the Doppler shift estimate discussed above. The non-carrier pilot tones are called engineered pilot tones, or, simply, NC pilot tones, hereinafter. Further, since the NC pilot tone only exists on one side of the carrier (single sideband) the Doppler shift will be present in signal spectra with no sign ambiguity even without IQ separation. Thus the sign of the Doppler shift (approaching vs. receding targets) will be accurately resolved. A similar result occurs if the NC pilot tone is introduced in the reference optical signal instead of the transmitted optical signal. Doppler correction on the basis of the recovered signed Doppler shift is identical to that described in previous methods.

In various embodiments, a variety of different components are used to introduce a non-carrier pilot tone on either: the output optical signal that is transmitted through scanning optics 322 for interaction with object 390; or, on a reference optical signal for mixing with a returned signal 324 in optical mixer 360.

Figure 5A:
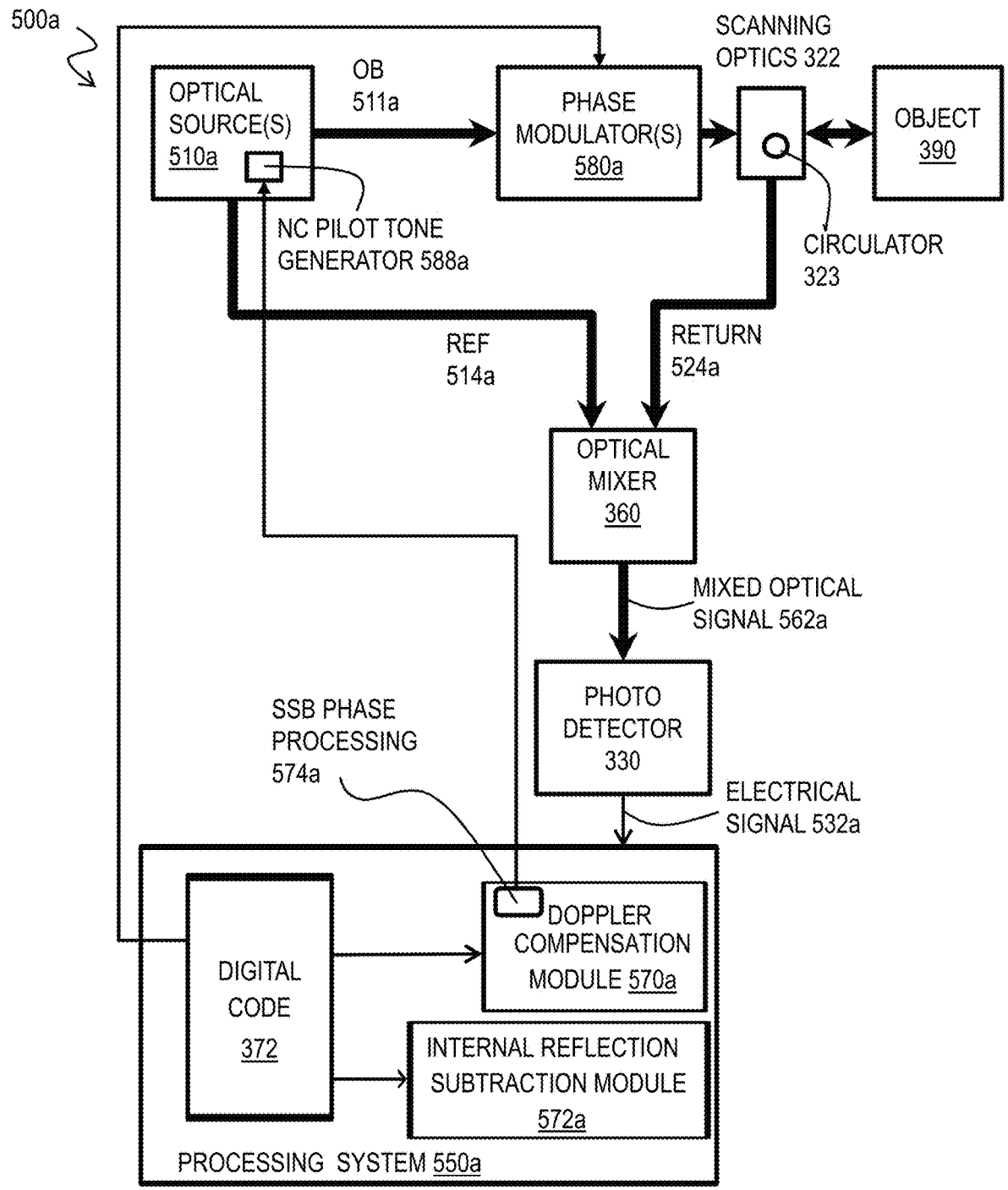
FIG. 5A is a block diagram that illustrates an example Doppler compensated LIDAR system using non-carrier pilot tone, according to an embodiment.

4.2 Doppler Compensated LIDAR using NC Pilot Tone and Int. Reflection Subtraction FIG. 5A is a block diagram that illustrates an example Doppler compensated LIDAR system using non-carrier pilot tone, according to an embodiment. While an object 390 is depicted for purposes of illustration, object 390 is not part of LIDAR system 500a. The scanning optics 322, circulator 323, optical mixer 360, photodetector 330, digital code module 372 and object 390 are as described above with respect to FIG. 3. Here however, the laser 310 and beam splitter 312 are replaced by optical source(s) 510a, with one or more lasers and other optical couplers to produce an optical base signal (OB 511a) for phase modulation, and a reference signal (REF 514a). Optical source(s) 510a includes a non-carrier pilot tone generator 588a (shown as, "NC pilot tone generator 588a" in FIG. 5A) configured to generate a pilot tone different from the carrier frequency of a laser used to generate optical base signal 511a. This configuration can be achieved either with different driving functions for the previous laser 310, or a separate laser with its own driving functions. The dual sideband phase modulator 380 is replaced with one or more phase modulator(s) 580a, including zero or more single sideband (SSB) or single sideband suppressed carrier (SSBSC) phase modulators, or some combination.

The processing system 350 is replaced with processing system 550a that includes a Doppler compensation module 570a containing a single sideband (SSB) phase processing module 574a. The processing system 550a also includes a phase tracking internal reflection subtraction module 572a for determining cross correlation and range based on electrical signal 532a. The NC pilot tone generator 588a is controlled by the SSB phase processing module 574a, which supplies the driving functions. The SSB phase processing module 574a also determines the signed Doppler shift based on the electrical signal 532a. The electrical signal 532a is output by detector 330 when struck by mixed optical signal 562a output by the optical mixer 360 when the REF 514a and return signal 524a are coincident on the optical mixer 360. The return signal 524a is received in response to transmitting the optical output signal from the phase modulators 580a through the scanning optics 322.

In some of these embodiments, the optical sources 510a uses a first laser driven to produce just the carrier frequency optical signal. The optical sources 510a uses a separate second laser driven by the SSB phase processing module 574a to produce a non-carrier pilot tone as NC pilot tone generator 588a. In some of these embodiments, the optical source(s) 510a includes a splitter that splits the carrier frequency optical signal to be directed both to the phase modulator(s) 580a as a component of the optical base (OB 511a) and to the optical mixer 360 as a component of the optical reference signal (REF 514a). In some of these embodiments, the NC pilot tone optical signal from the NC pilot tone generator 588a is added to either the optical base signal (OB 511a) or the optical reference signal (REF 514b) using a combiner optical coupler—but not to both. In some embodiments, the REF 514a includes only the NC pilot tone without the carrier frequency optical signal and the optical base signal (OB 511a) comprises only the carrier frequency optical signal.

In some embodiments, the optical source(s) includes a single laser that produces the carrier frequency optical signal and a splitter that directs most of the energy to the phase modulator(s) 580a as OB 511a. The optical source(s) 510a also includes an acousto-optic modulator (AOM) to shift the optical frequency of the low energy beam emitted from the splitter to the NC pilot tone which is then output to optical mixer 360 as REF 514a. In these embodiments, the AOM is controlled by the SSB phase processing module 574a by driving an acoustic source to produce an acoustic frequency sufficient to shift the optical frequency to the desired pilot frequency in the AOM.

The phase code is phase modulated on top of the optical base signal (OB 511a) using phase modulator(s) 580a. The SSB phase processing module 574a determines the signed Doppler shift based on the electrical signal 532a, the known pilot frequency of the NC pilot tone, and whether the pilot tone is in the REF 514a or is in the electrical signal 532a as a result of having been added to the optical base signal (OB511a). The existing code in the Doppler Detection module uses the signed Doppler shift from the SSB phase processing module 574a to correct the ranges and present the range and properly signed relative speed.

Figure 5B:
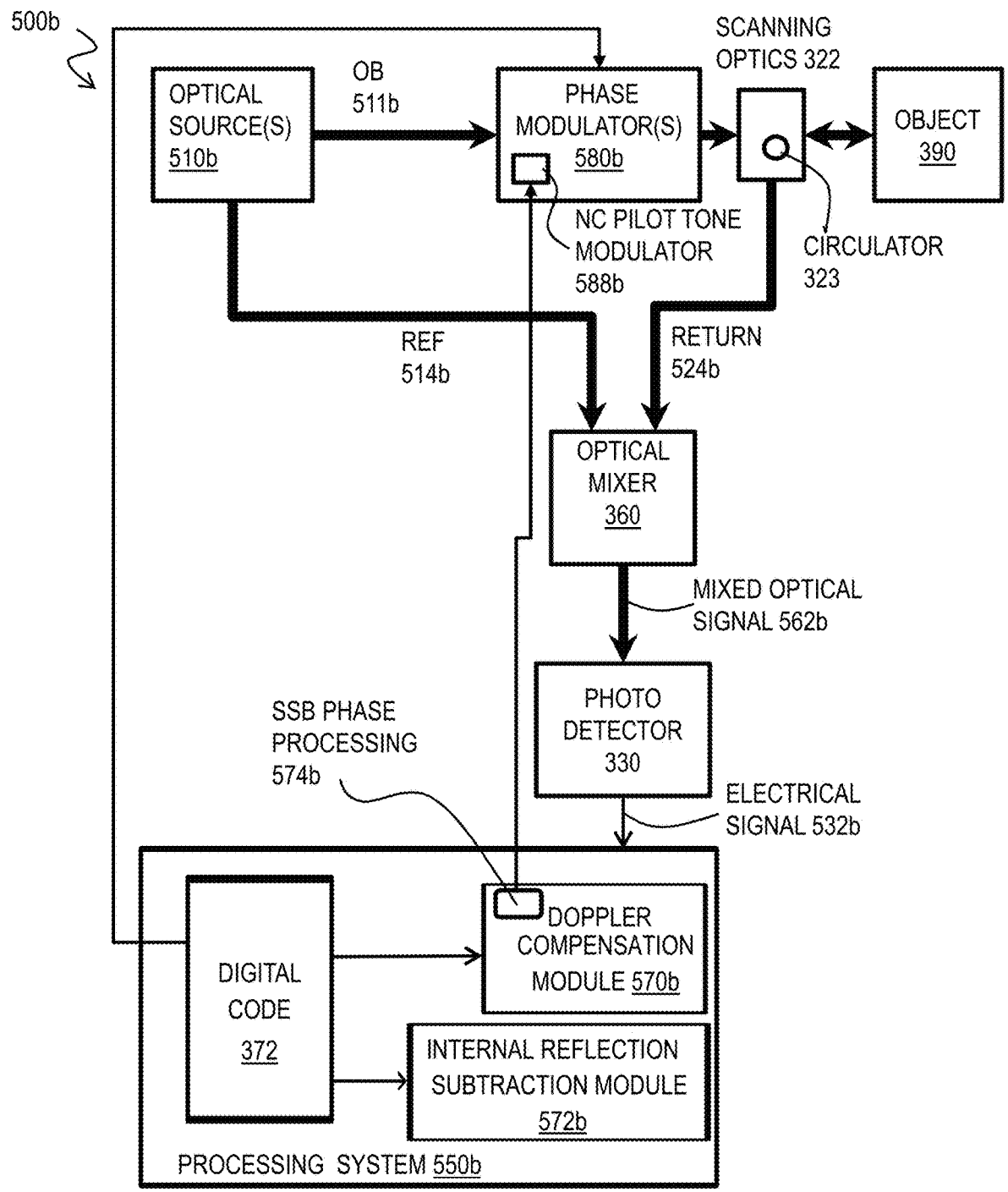
FIG. 5B is a block diagram that illustrates an example Doppler compensated LIDAR system using non-carrier pilot tone, according to an embodiment.

FIG. 5B is a block diagram that illustrates an example Doppler compensated LIDAR system using non-carrier pilot tone, according to another embodiment. In these embodiments, the phase modulator(s) are configured to generate an NC pilot tone and thus include a NC pilot tone generator 588b. The NC pilot tone generator 588a of laser sources 510a is omitted from optical source(s) 510b. While an object 390 is depicted for purposes of illustration, object 390 is not part of LIDAR system 500b. The scanning optics 322, circulator 323, optical mixer 360, photodetector 330, digital code module 372 and object 390 are as described above with respect to FIG. 3. Here optical source(s) 510a are replaced by optical source(s) 510b, with one or more lasers and other optical couplers to produce an optical base signal (OB 511b) for phase modulation, and a reference signal (REF 514b).

The phase modulator(s) 580a are replaced by phase modulator(s) 580b which include a NC pilot tone generator 588b configured to generate a pilot tone different from the carrier frequency. The NC pilot tone generator 588b includes one or more single sideband (SSB) or single sideband suppressed carrier (SSBSC) phase modulators, or other optical components, or some combination. In some embodiments a single SSBSC phase modulator imposes both the phase code and the pilot tone.

In some embodiments, the phase modulator(s) 580b include a splitter, a combiner, a dual sideband phase modulator to impose the phase code signal, and a SSB phase modulator as the NC pilot tone generator 588b. The splitter splits the optical base signal (OB 511a) into two beams of roughly equal strength, sending one beam into the dual sideband phase modulator and the other into the SSB phase modulator as NC pilot tone generator 588b. The outputs from the two modulators are combined in the optical combiner to produce the output optical signal that is transmitted through scanning optics 322.

In some embodiments, the phase modulator(s) includes a single DSB or SSB or SSBSC phase modulator to impose the phase code, and an acousto-optic modulator (AOM) as the NC pilot tone generator 588b to shift the optical frequency of the optical base signal with the carrier frequency to the NC pilot tone. In these embodiments, the AOM is controlled by the SSB phase processing module 574b by driving an acoustic source to produce an acoustic frequency sufficient to shift the optical frequency to the desired pilot frequency in the AOM.

The processing system 350 is replaced with processing system 550b that includes a Doppler compensation module 570b containing a single sideband phase processing module 574b. The processing system 550b also includes a phase tracking internal reflection subtraction module 572b for determining cross correlation and range based on electrical signal 532a. The NC pilot tone generator 588b is controlled by the SSB phase processing module 574b, which supplies the phase codes that generate the pilot tone as well as the phase encoded LIDAR signal. The SSB phase processing module also determines the signed Doppler shift based on the electrical signal 532b. The electrical signal 532b is output by detector 330 when struck by mixed optical signal 562b output by the optical mixer 360 when the REF 514b and return signal 524b are coincident on the mixer. The return signal 524b is received in response to transmitting the optical output signal from the phase modulator(s) 580b through the scanning optics 322.

4.3 Doppler Compensated LIDAR: Spectrum of a Doppler Shifted SSB Return Signal

Figure 6A:
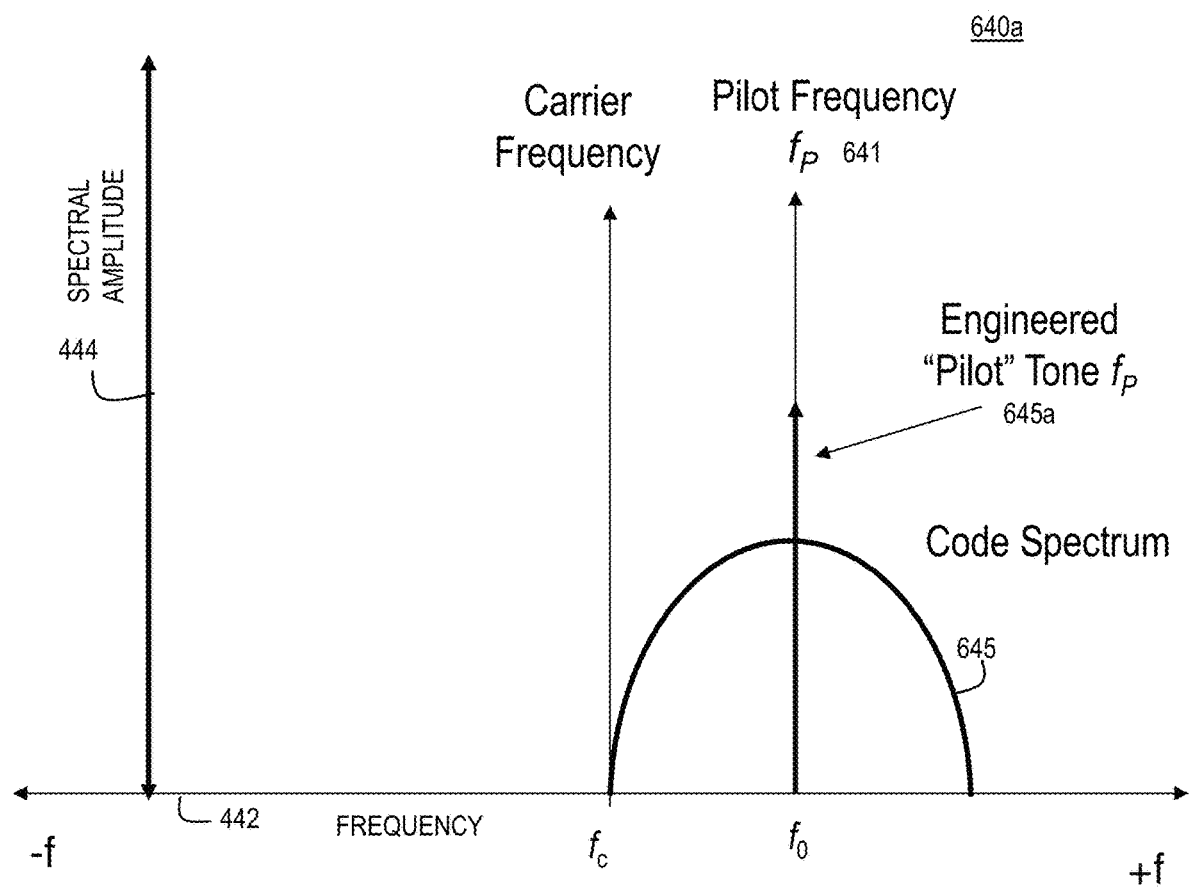
FIG. 6A is a schematic graph that illustrates an example spectrum of the SSB output optical signal, according to an embodiment.

FIG. 6A is a schematic graph 640a that illustrates an example spectrum 645 of the SSB output optical signal, according to an embodiment. The transmitted spectrum 645 in the case of single sideband suppressed carrier is entirely to one side of the carrier frequency $f_c$ (RF=0, DC) and has a peak at RF $f_0 \neq 0$. The spectrum also shows a spike in spectral density at a non-carrier pilot tone $f_P$ co-located with the code peak ($f_P = f_0$); but the non-carrier pilot tone need not be at the peak in other embodiments. This non-carrier pilot tone will not only guide the detection of a Doppler shift; but, also provide an unambiguous determination of Doppler shift sign as described in more detail below.

Figure 6B:
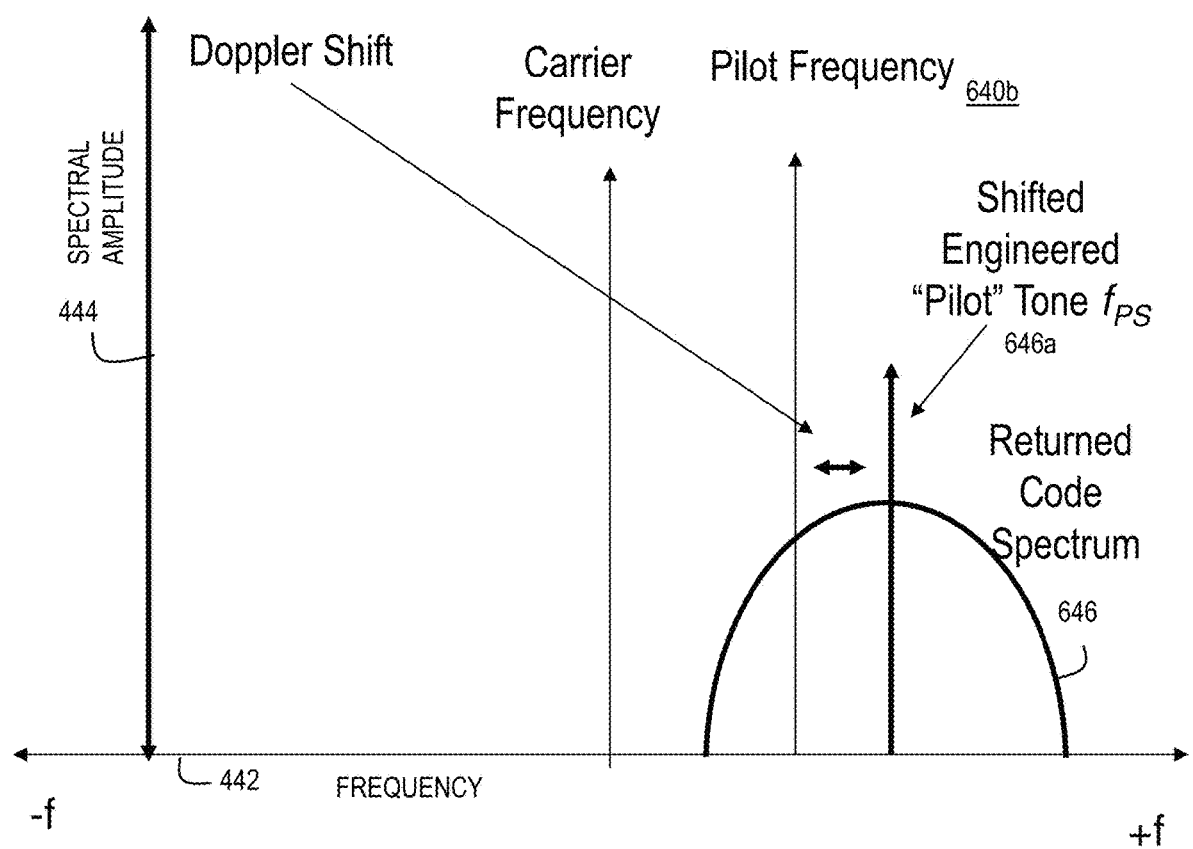
FIG. 6B is a schematic graph that illustrates an example spectrum of a Doppler shifted SSB optical return signal when IQ processing is done, according to an embodiment.

FIG. 6B is a schematic graph 640b that illustrates an example spectrum of a Doppler shifted SSB optical return signal when IQ processing is done, according to an embodiment. This shows back-reflected and Doppler shifted spectrum from an object as trace 646 in the case of single sideband suppressed carrier. The Doppler shift and sign are readily determined as the difference between the measured dominant spectral peak at the shifted non-carrier pilot tone 646a (designated $f_{PS}$) and the pilot frequency $f_P$ (see Equation 9, below). This new calculation of the signed Doppler shift is used in the SSB phase processing module 574a, 57b, described above. This signed Doppler shift is used to correct the calculation of range as well as relative velocity of the object, as in prior approaches.

Figure 6C:
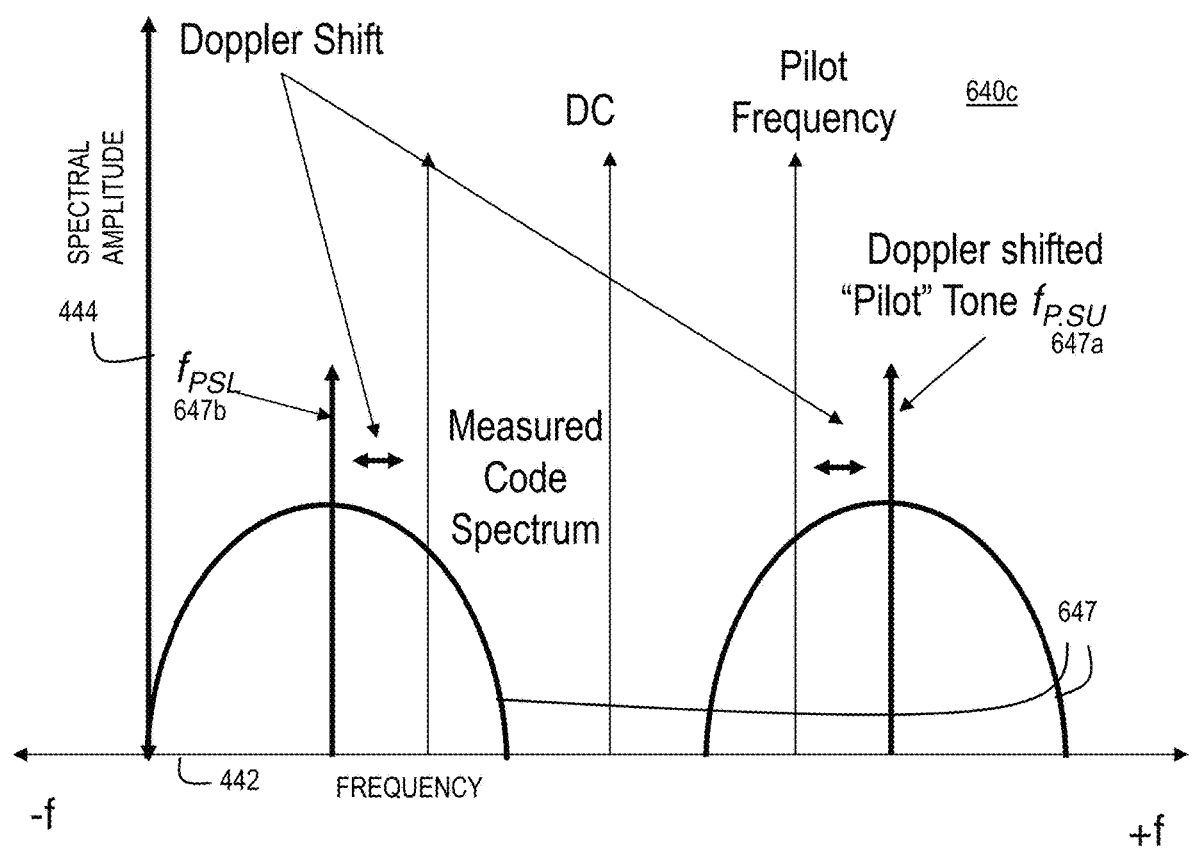
FIG. 6C is a schematic plot that illustrates an example spectrum of a Doppler shifted SSB return signal spectrum when IQ processing is not done, according to an embodiment.

FIG. 6C is a schematic plot 640c that illustrates an example spectrum of a Doppler shifted SSB return signal spectrum when IQ processing is not done, according to an embodiment. The resulting spectrum 647 is the true response 646 and the reflection thereof around the carrier frequency. Note that, when converting to the RF signal, both in driving the modulation and after down-mixing in the optical mixer, the carrier frequency corresponds to the DC component of the RF signal at 0 frequency. Because the non-carrier pilot tone frequency 647a is off the symmetry axis, it is evident in both halves of the return spectrum. In the case of non-IQ sampling, the resultant two-sided power spectrum 647 has two pilot tone peaks 647a and 647b, designated upper and lower shifted pilot tones, $f_{PSU}$ and $f_{PSL}$, above and below the carrier frequency, respectively. These two peaks allow recovery of the signed Doppler shift $\Delta f_D$, as given by Equation 8a or Equation 8b.

$$\Delta f_D = f_{PSU} - f_P \tag{8a}$$

$$\Delta f_D = f_{PSL} - (-f_P) = f_{PSL} + f_P \tag{8b}$$

4.4 Method for Doppler Compensation using SSB Phase-encoded LIDAR

Figure 7:
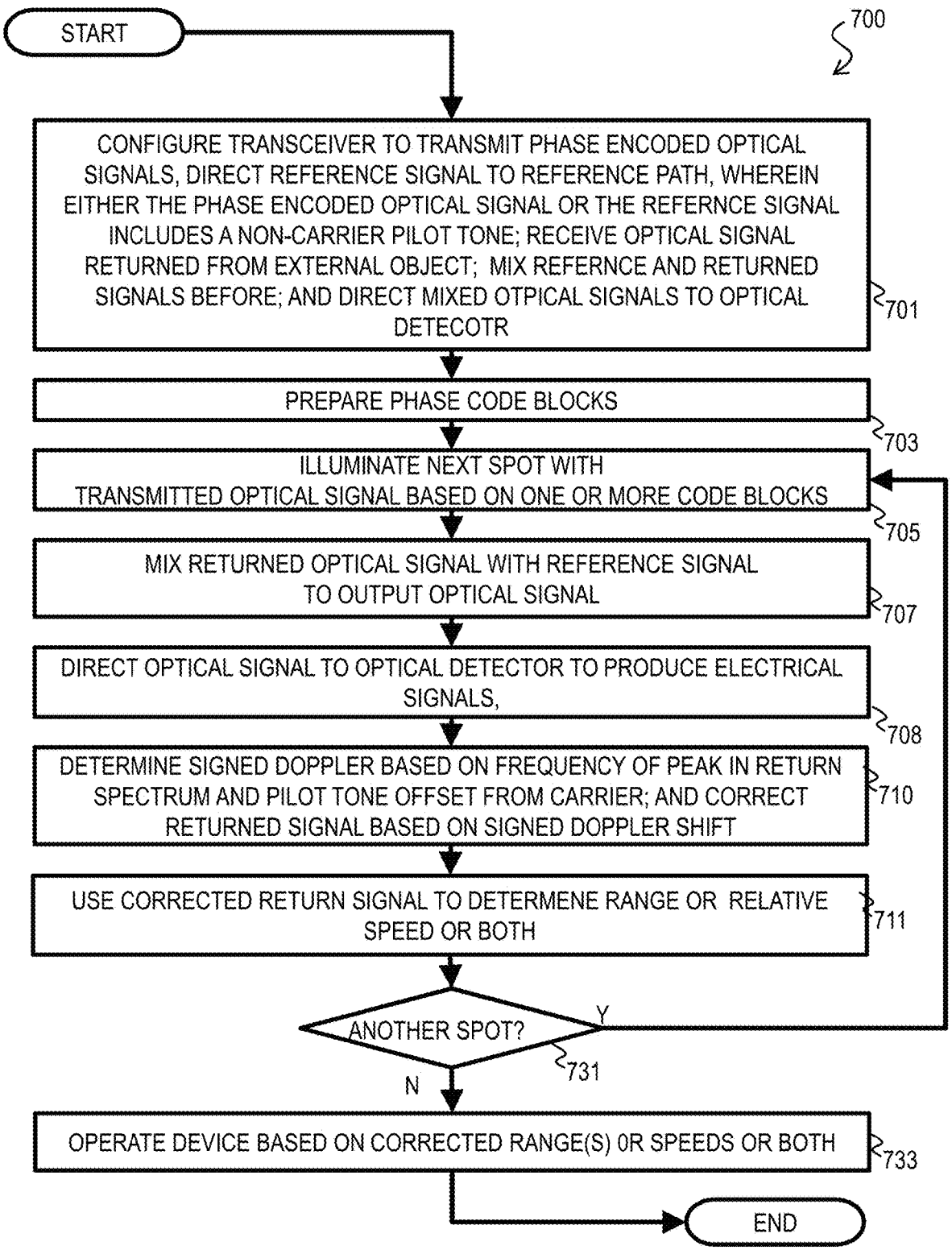
FIG. 7 is a flow diagram that illustrates example operations for using a signed Doppler compensated SSB phase-encoded LIDAR system, according to an embodiment.

FIG. 7 is a flow chart that illustrates an example method for using single-sideband phase-encoded LIDAR system to determine and compensate for signed Doppler shift effects on ranges, according to an embodiment. Although operations are depicted in FIG. 7 as integral operations in a particular order for purposes of illustration, in other embodiments, one or more operations, or portions thereof, are performed in a different order, or overlapping in time, in series or in parallel, or are omitted, or one or more additional operations are added, or the method is changed in some combination of ways. In some embodiments, some or all operations of method 700 may be performed by one or more LIDAR systems, such as LIDAR system 200 in FIG. 2, LIDAR system 300 in FIG. 3, LIDAR system 500a in FIG. 5A, and/or LIDAR system 500b in FIG. 5B. For example, in some embodiments, operations 703 and 710 through 733 may be performed by processing system 350 in FIG. 3 and/or processing system 550 in FIG. 5A and FIG. 5B.

In operation 701, a transceiver, e.g., a LIDAR system, is configured to transmit phase-encoded optical signals based, at least in part, on input of a phase code sequence. A portion (e.g., 1% to 10%) of the unmodulated input optical signal from the laser, or the phase-encoded transmitted signal, is also directed to a reference optical path. Either the phase encode optical signal or the reference signal includes a NC pilot tone, but not both. For example, the LIDAR is configured as depicted in FIG. 5A or FIG. 5B or some combination. The transceiver is also configured to receive a backscattered optical signal from any external object illuminated by the transmitted signals. In some embodiments, operation 701 includes configuring other optical components in hardware to provide the functions of one or more of the following operations as well. Note that the transmitted signal need not be a beam. A diverging signal will certainly see a lot of different ranges and Doppler values within a single range profile; but, provide no cross range resolution within an illuminated spot. However, it is advantageous to use a narrow beam which provides inherent sparsity that comes with point by point scanning to provide the cross range resolution useful to identify an object.

In operation 703 a code made up of a sequence of M*N symbols is generated for use in ranging, representing M blocks of N symbols each selected from the n symbol alphabet, with no duplicate series of N symbols among the M blocks. In some embodiments, the Fourier transform of an RF signal with such phase encoding is also determined during operation 703 for use in determining the Doppler shift, as described in Crouch I.

In operation 705 a first portion of the laser output, represented by Equation 4, is modulated using code received from digital code module 372 with a single-sideband phase modulator, such as a SSBSC phase modulator, to produce a transmitted single-sideband phase-encoded signal with non-carrier pilot tone, as represented by Equation 6, and directed to a spot in a scene where there might be, or might not be, an object or a part of an object. In addition, in operation 705 a second portion of the laser output is directed as a reference signal, as represented by Equation 5a or Equation 5c, also called a local oscillator (LO) signal, along a reference path.

In operation 707, the backscattered returned signal, R, with any travel time delay $\Delta t$ and Doppler shift $\omega_D$, as represented by Equation 7a or Equation 7b, is mixed with the reference signal LO, as represented by Equation 5a or Equation 5c, to output one or more mixed optical signals 362. In some embodiments performing I/Q processing, the mixed signal informs on the in-phase and quadrature components.

In operation 708, the mixed optical signals are directed to and detected at one or more optical detectors to convert the optical signals to one or more corresponding electrical signals.

In some embodiments, averaging and internal reflection subtraction is performed over several different return signals S(t) to remove spurious copies of the transmitted optical signal produced at internal optical components along the return signal path, such as circulator 323. Such spurious copies can decrease the correlation with the actual return from an external object and thus mask actual returns that are barely detectable. If the averaging is performed over a number P of different illuminated spots, and returns such that a single object is not in all those illuminated spots, then the average is dominated by the spurious copy of the code produced by the internal optical components. This spurious copy of the code can then be removed from the returned signal to leave just the actual returns in a corrected complex electrical signal S(t). P is a number large enough to ensure that the same object is not illuminated in all spots. A value as low as P=100 is computationally advantageous for graphical processing unit (GPU) implementations; while a value as high as P=1000 is preferred and amenable to field-programmable gate array (FPGA) implementations. In an example embodiment, P is about 100. In other embodiments, depending on the application, P can be in a range from about 10 to about 5000.

In some embodiments of operation 708 it is determined whether P returns have been received. If not, control passes back to operation 705 to illuminate another spot. If so, then the average signal is computed, doing phase weighting in some embodiments, and the average is subtracted from the returned signal to remove the effect of internal reflections.

In operation 710, the signed Doppler shift is determined and used to correct the return signal. If separate I/Q detection and processing is not used, then the frequencies of two peaks $f_{PSL}$ and $f_{PSU}$ are found in the electrical signal based on the mixture of the reference and returned signals; and, the signed Doppler shift is determined using Equation 8a, or Equation 8b or Equation 8c. If separate I/Q detection and processing is used, then the frequency of the single dominant peaks fps is found in the returned spectrum; and, the signed Doppler shift is determined using Equation 9.

$$\Delta f_D = f_{PS} - f_P \qquad (9)$$

Then, the signed Doppler shift is used to correct the time domain or spectrum of the returned signal. The estimate should be within the frequency resolution of the system set by the duration of processing interval. The Doppler shifted, time delayed code term (after downmixing) for the electric field and kth return is given by Equation 10a, $$E_{Rk} = SA_k e^{i[\omega_C \Delta t_k + \omega_{D_k}(t+\Delta t_k) + B(t+\Delta t_k)]} \qquad (10a)$$

The correction with the Doppler estimate is achieved by a vector multiplication in the time domain (or the CIRCSHIFT method in the frequency domain). This vector multiplication is depicted in Equation 10b.

$$E_{Rk} = SA_k e^{i[\omega_C(\Delta t_k) + \omega_{D_k}(t+\Delta t_k) + B(t+\Delta t_k)]} * e^{-i[\omega_{D_k}(t)]} \qquad (10b)$$
$$= A_k e^{i[\omega_C(\Delta t_k) + \omega_{D_k}(\Delta t_k) + B(t+\Delta t_k)]}$$

In Equation 10b, one can see residual phase terms remain, but the oscillating Doppler component of the argument is removed (compensated out).

In operation 711, a corrected return signal is used to detect the range or relative speed or both. In some embodiments with multiple signed Doppler shifts for a single return, operation 711 includes associating each delay time with one of the signed Doppler shifts, assuming that a particular return is based on an object or part of an object moving at a particular average speed over the duration of one transmitted signal. For a given signed Doppler correction, only those range peaks associated with that signed Doppler correction will be present in the cross correlation. So it is improbable to incorrectly pair a given range and signed Doppler in the case of multiple instances.

In operation 731, it is determined if another spot is to be illuminated. If so, control passes back to operation 703 and following. If not, control passes to operation 733.

In operation 733, a device is operated based on the corrected ranges or speeds or both. In some embodiments, this involves presenting on a display device an image that indicates a Doppler corrected position of any object at a plurality of spots illuminated by the transmitted optical signal. In some embodiments, this involves communicating, to the device, data that identifies at least one object based on a point cloud of corrected positions at a plurality of spots illuminated by transmitted optical signals. In some embodiments, this involves moving a vehicle to avoid a collision with an object, wherein a closing speed between the vehicle and the object is determined based on a size of the Doppler effect at a plurality of spots illuminated by the transmitted optical signal. In some embodiments, this involves identifying the vehicle or identifying the object on the collision course based on a point cloud of corrected positions at a plurality of spots illuminated by the transmitted optical signal.

4.5 Binary Phase Codes

An interesting case has been noted for binary phase codes when pursuing this approach. It is noted that the Nyquist frequency of the pulse rate is designated $f_N$. A tone at half the Nyquist frequency ($f_N/2$) requires only 4 phase states ($-\pi/2$, 0, $\pi/2$ and $\pi$) to fully represent both the frequency shifted code B(t) and the pilot tone $2\pi f_P$ and $)_P$. Two of these phases (e.g., 0 and $\pi$) are used as binary phase encoding B(t) and the other two (e.g., $-\pi/2$ and $\pi/2$) construct the single sided pilot tone $2\pi f_P$ at a phase $)_P$ different from either of the phases used in the binary code. This has advantages relative to available digital to analog waveform sources (e.g., allowing the use of FPGA transceivers versus costly high bit depth DACs), limiting required RAM requirements to buffer the waveform (since four phases has such low bit depth), and limiting the power utilization of RF drivers (e.g., may allow power efficient limiting amplifiers to be used in place of more power hungry linear amplifiers).

If the baud rate ($1/\tau$) is designated BAUD, then the Nyquist frequency will be BAUD/2. Half the Nyquist frequency is BAUD/4 and the corresponding angular frequency $\bar{f}_{HN} = 2\pi \text{BAUD}/4$. Relative to equation (6b) the amplitude P of the pilot tone and amplitude S of the phase code components need to be equivalent as well. Digitally the RF waveform to drive the single sideband phase modulator, D, is achieved by the following operations. Start with code waveform given by Equation 11a.

$$Da = \exp(i\ B(t)) \qquad (11a)$$

Multiply by tone at half Nyquist freq ($\bar{f}_{HN}$) to upshift off DC as given by Equation 11b.

$$Db = \exp(i\ \bar{f}_{HN}) * \exp(i\ B(t)) \qquad (11b)$$

Add tone at half Nyquist frequency to give final driving RF signal given by Equation 11C.

$$D = \exp(i\ \bar{f}_{HN}) + \exp(i\ \bar{f}_{HN}) * \exp(i\ B(t)) \qquad (11c)$$

This waveform D is used to drive the SSB phase modulator.

Figure 8:
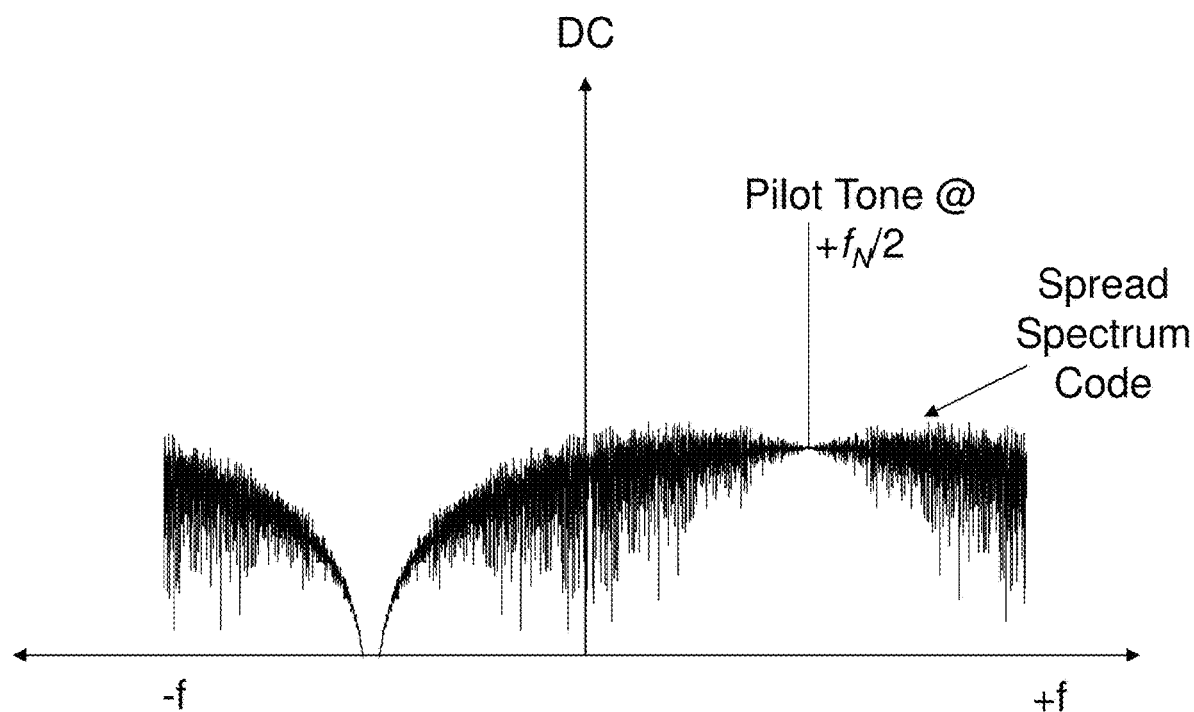
FIG. 8 is a graph that illustrates an example transmitted optical signal with a non-carrier pilot tone, according to an embodiment.

FIG. 8 is a graph that illustrates an example transmitted optical signal with a non-carrier pilot tone, according to an embodiment. Trace 845 shows an example frequency shifted, spread spectrum binary phase code plus pilot tone. This waveform has the interesting property, as described herein, of being represented by only 4 phase states; and, thus, provides a useful way to limit electronic and power resources to drive the waveform.

4.6 Method for Internal Reflection Subtraction

Figure 9A:
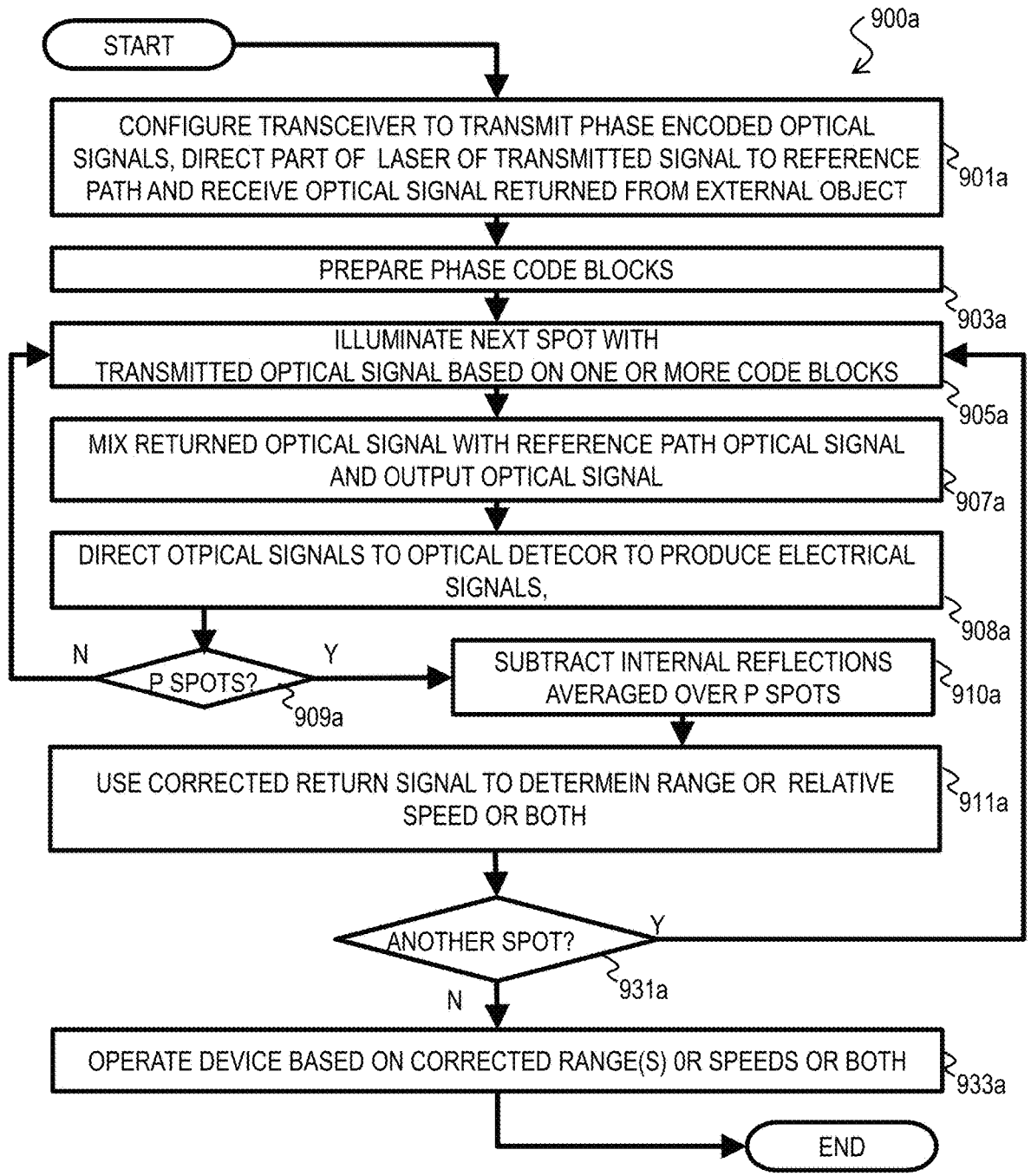
FIG. 9A is a flow chart that illustrates an example method for operating a phase-encoded LIDAR system to determine and compensate for internal reflections, according to an embodiment.

FIG. 9A is a flow chart that illustrates an example method for using phase-encoded LIDAR system to determine and compensate for internal reflection effects on ranges, according to an embodiment. Although operations are depicted in FIG. 9A, and subsequent flow diagram FIG. 11 and FIG. 12, as integral operations in a particular order for purposes of illustration, in other embodiments, one or more operations, or portions thereof, are performed in a different order, or overlapping in time, in series or in parallel, or are omitted, or one or more additional operations are added, or the method is changed in some combination of ways. In some embodiments, some or all operations of method 900a may be performed by one or more LIDAR systems, such as LIDAR system 200 in FIG. 2, LIDAR system 300 in FIG. 3, LIDAR system 500a in FIG. 5A, and/or LIDAR system 500b in FIG. 5B. For example, in some embodiments, operations 903a and 910a through 933a may be performed by processing system 350 in FIG. 3 and/or processing system 550 in FIG. 5A and FIG. 5B.

In operation 901a, a transceiver, e.g., a LIDAR system, is configured to transmit phase-encoded optical signals based on input of a phase code sequence. A portion (e.g., 1% to 10%) of the unmodulated input optical signal from the laser, or the phase-encoded transmitted signal, is also directed to a reference optical path. The transceiver is also configured to receive a backscattered optical signal from any external object illuminated by the transmitted signals. In some embodiments, operation 901a includes configuring other optical components in hardware to provide the functions of one or more of the following operations as well. Note that the transmitted signal need not be a beam. A diverging signal will certainly see a lot of different ranges and Doppler values within a single range profile; but, provide no cross range resolution within an illuminated spot. However, it is advantageous to use a narrow beam which provides inherent sparsity that comes with point by point scanning to provide the cross range resolution useful to identify an object.

In operation 903 a code made up of a sequence of M*N symbols is generated for use in ranging, representing M blocks of N symbols each selected from the n symbol alphabet, with no duplicate series of N symbols among the M blocks. In some embodiments, the Fourier transform of an RF signal with such phase encoding is also determined during operation 903a for use in determining the Doppler shift, as described in WO2018/144853.

In operation 905a a first portion of the laser output, represented by Equation 4, is phase-encoded using code received from digital code module 372 to produce a transmitted phase-encoded signal, as represented by Equation 6a, and directed to a spot in a scene where there might be, or might not be, an object or a part of an object. In addition, in operation 905a a second portion of the laser output is directed as a reference signal, as represented by Equation 5a or Equation 5b, also called a local oscillator (LO) signal, along a reference path.

In operation 907a, the backscattered returned signal, R, with any travel time delay $\Delta t$ and Doppler shift $\omega_D$, as represented by Equation 7a, is mixed with the reference signal LO, as represented by Equation 5a or Equation 5b, to output one or more mixed optical signals 362. In some embodiments performing Doppler shift detection and correction, the mixed signal informs on the in-phase and quadrature components.

In operation 908a, the mixed optical signals are directed to and detected at one or more optical detectors to convert the optical signals to one or more corresponding electrical signals. For example, in some embodiments that do Doppler corrections, as described in WO2018/144853, two electrical signals are produced by the detectors. One electrical signal on one channel (Ch 1) indicates down-mixed in-phase component I; and the other electrical signal on a different channel (CH 2) indicates down-mixed quadrature component Q. A complex down-mixed signal S is computed based on the two electrical signals. In any case one or more electrical signals are produced in operation 908a.

Figure 11:
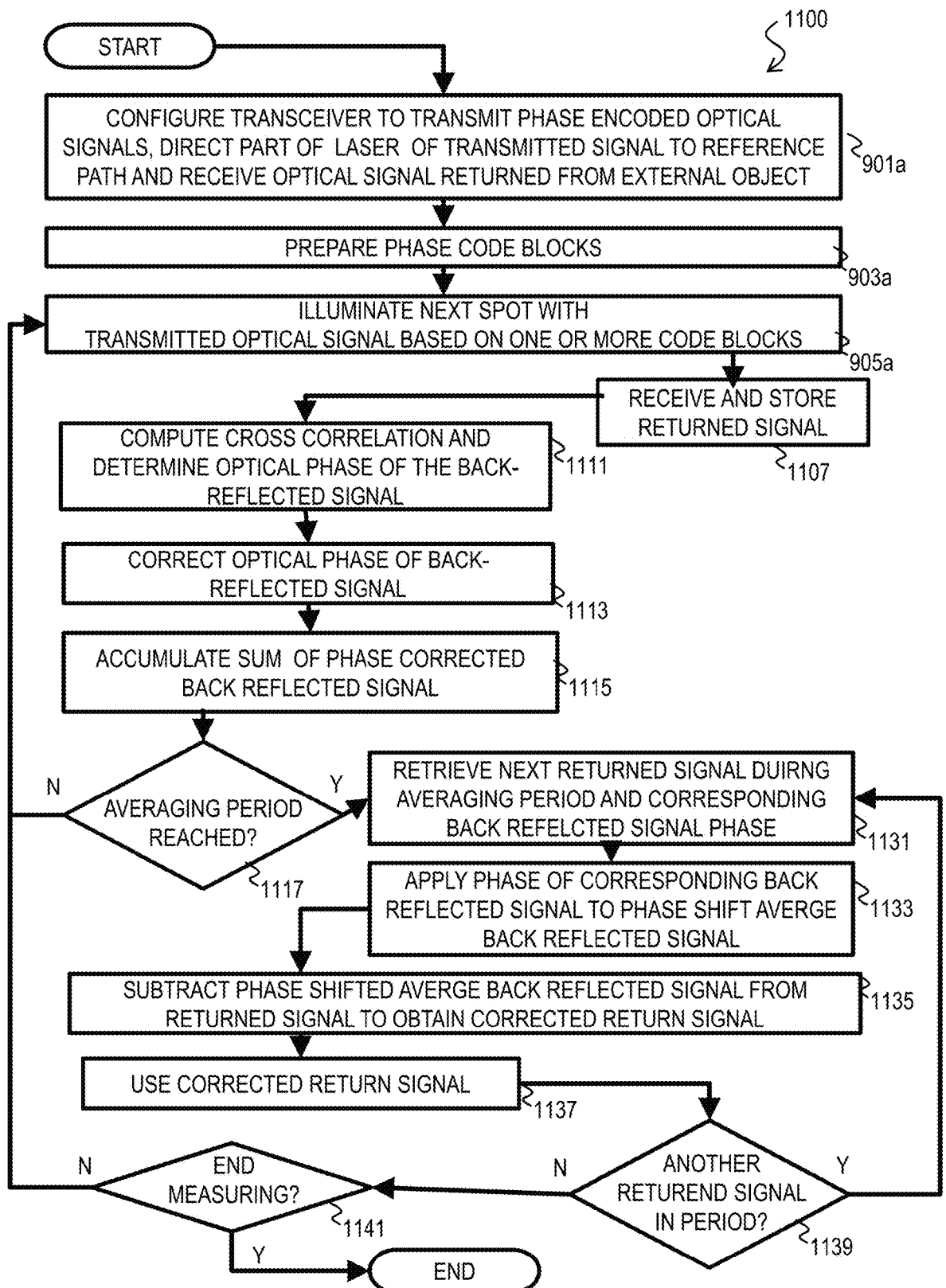
FIG. 11 is a flow chart that illustrates an example method for phase tracking internal reflections before subtraction, according to an embodiment.

In some embodiments, averaging and internal reflection subtraction is performed over several different return signals S(t) to remove spurious copies of the phase-encoded signal produced at internal optical components along the return signal path, such as scanning optics 322. Such spurious copies can decrease the correlation with the actual return from an external object and thus mask actual returns that are barely detectable. If the averaging is performed over a number P of different illuminated spots, and returns such that a single object is not in all those illuminated spots, then the average is dominated by the spurious copy of the code produced by the internal optical components. This spurious copy of the code can then be removed from the returned signal to leave just the actual returns in a corrected complex electrical signal S(t). P is a number large enough to ensure that the same object is not illuminated in all spots. A value as low as P=100 is computationally advantageous for graphical processing unit (GPU) implementations; while a value as high as P=1000 is preferred and amenable to field-programmable gate array (FPGA) implementations. In an example embodiment, P is about 100. In other embodiments, depending on the application, P can be in a range from about 10 to about 5000. FIG. 11 is a block diagram that illustrates example multi-spot averaging to remove returns from internal optics, according to an embodiment. Operations 909a and 910a perform this correction.

In operation 909a it is determined whether P returns have been received. If not, control passes back to operation 905a to illuminate another spot. If so, then control passes to operation 910a. In operation 910a the average signal, $S_S(t)$ is computed according to Equation 12a where each received signal of duration D is designated $S_p(t)$.

$$S_S(t) = \frac{1}{P}\sum_{p=1}^{P} S_p(t) \tag{12a}$$

This average signal is used to correct each of the received signals $S_p(t)$ to produce corrected signals $S_{pC}(t)$ to use as received signal S(t) in subsequent operations, as given by Equation (6b)

$$S(t)=S_{pC}(t)=S_p(t)-S_S(t) \tag{12b}$$

In some embodiments, the internal optics are calibrated once under controlled conditions to produce fixed values for $S_S(t)$ that are stored for multiple subsequent deployments of the system. Thus operation 910a includes only applying Equation 12b. In some embodiments, the spurious copies of the code produced by the internal optics are small enough, or the associated ranges different enough from the ranges to the external objects, that operation 909a and 910a can be omitted. Thus, in some embodiments, operations 909a and 910a are omitted, and control passes directly from operation 908a to operation 911a, using S(t) from operation 908a rather than from Equation 12b in operation 910a.

In operation 911a, a corrected return signal is used to detect the range or Doppler shift or both.

In operation 933a, a device is operated based on the corrected ranges or speeds or both. In some embodiments, this involves presenting on a display device an image that indicates a Doppler corrected position of any object at a plurality of spots illuminated by the transmitted optical signal. In some embodiments, this involves communicating, to the device, data that identifies at least one object based on a point cloud of corrected positions at a plurality of spots illuminated by transmitted optical signals. In some embodiments, this involves moving a vehicle to avoid a collision with an object, wherein a closing speed between the vehicle and the object is determined based on a size of the Doppler effect at a plurality of spots illuminated by the transmitted optical signal. In some embodiments, this involves identifying the vehicle or identifying the object on the collision course based on a point cloud of corrected positions at a plurality of spots illuminated by the transmitted optical signal.

A range profile often is made up of maximum correlation in each of multiple range bins associated with different lag times. Range bins are distinguished by a range bin index that increases with distance (lag time). A distance (range) associated with an index is the index number multiplied by the range bin size. The range bin size is given by the time lag increment multiplied by the speed of light in the medium. In the examples given below, unless otherwise stated, the range bin size is 1 meter.

As described in WO2018/144853, it was found in experimentation that back reflections from the optical surfaces in the system contribute to a series of very large returns (cross correlations) in the range profile. These large returns cause large sidelobe structures in the range profile (power of cross correlation with phase code versus time intervals that correspond to range bins) that could obscure smaller returns from real targets. To combat this issue, the coherent processing scheme described above was devised to subtract an estimate of the portion of the signal pertaining to the circulator optics. With the correction, $S_S(t)$, in hand, it is applied by coherently subtracting the complex vector from the subset of code blocks. The result is an extremely effective reduction in the strength of the circulator range returns and the associated sidelobes.

Figure 9B:
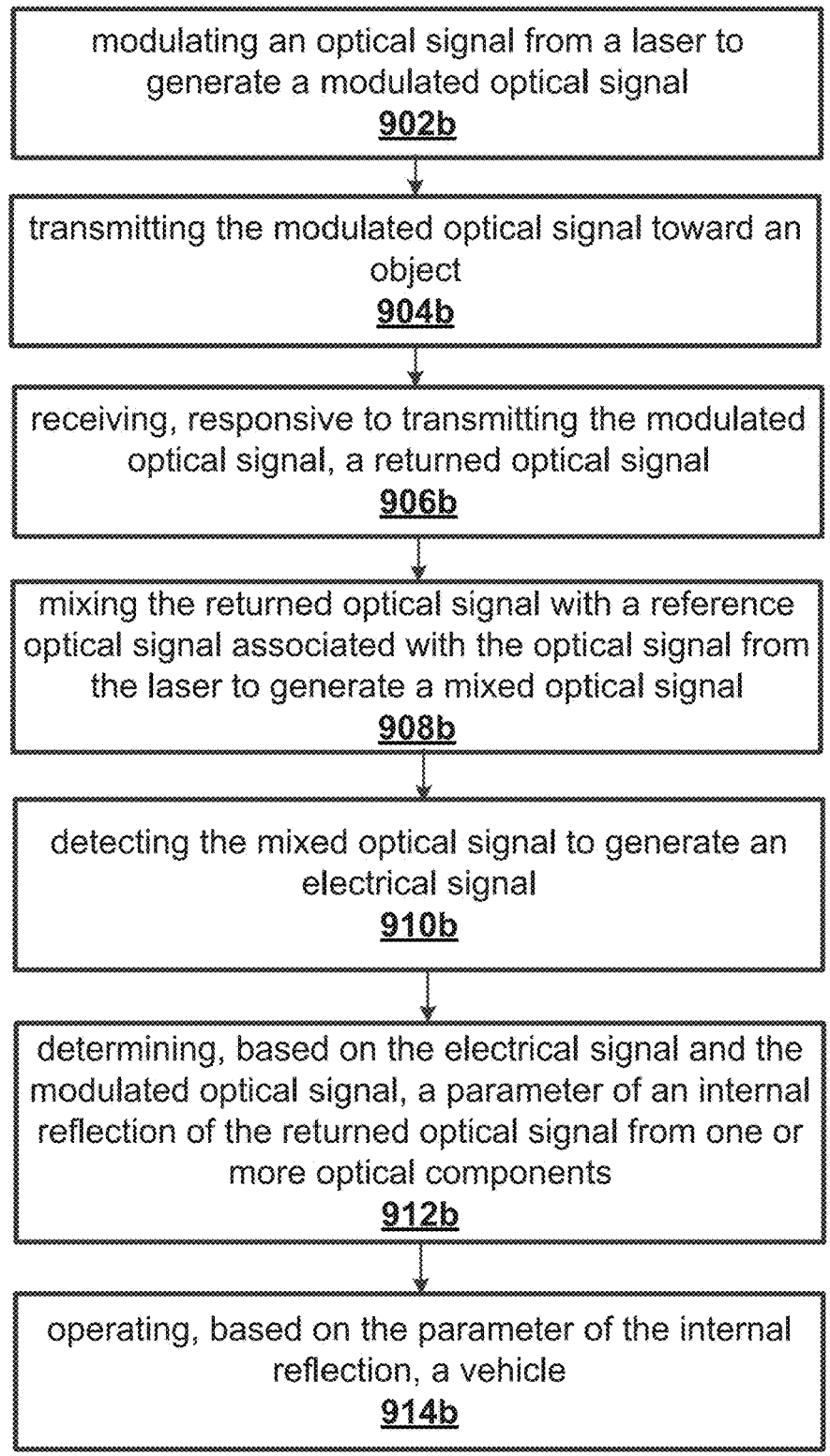
FIG. 9B is a flow chart that illustrates an example method for operating a phase-encoded LIDAR system to determine and compensate for internal reflections, according to an embodiment.

FIG. 9B is a flow chart that illustrates an example method for using phase-encoded LIDAR system to determine and compensate for internal reflection effects on ranges, according to an embodiment. Although operations are depicted in FIG. 9B, and subsequent flow diagram FIG. 11 and FIG. 12, as integral operations in a particular order for purposes of illustration, in other embodiments, one or more operations, or portions thereof, are performed in a different order, or overlapping in time, in series or in parallel, or are omitted, or one or more additional operations are added, or the method is changed in some combination of ways. In some embodiments, some or all operations of method 900b may be performed by one or more LIDAR systems, such as LIDAR system 200 in FIG. 2, LIDAR system 300 in FIG. 3, LIDAR system 500a in FIG. 5A, and/or LIDAR system 500b in FIG. 5B.

The method 900b includes operation 902b of modulating an optical signal from a laser to generate a modulated optical signal. The method includes operation 904b of transmitting the modulated optical signal toward an object. The method includes operation 906b of receiving, responsive to transmitting the modulated optical signal, a returned optical signal. The method includes operation 908b of mixing the returned optical signal with a reference optical signal associated with the optical signal from the laser to generate a mixed optical signal. The method includes operation 910b of detecting the mixed optical signal to generate an electrical signal. The method includes operation 912b of determining, based on the electrical signal and the modulated optical signal, a parameter of an internal reflection of the returned optical signal from one or more optical components. The method includes operation 914b of operating, based on the parameter of the internal reflection, a vehicle.

Figure 10A:
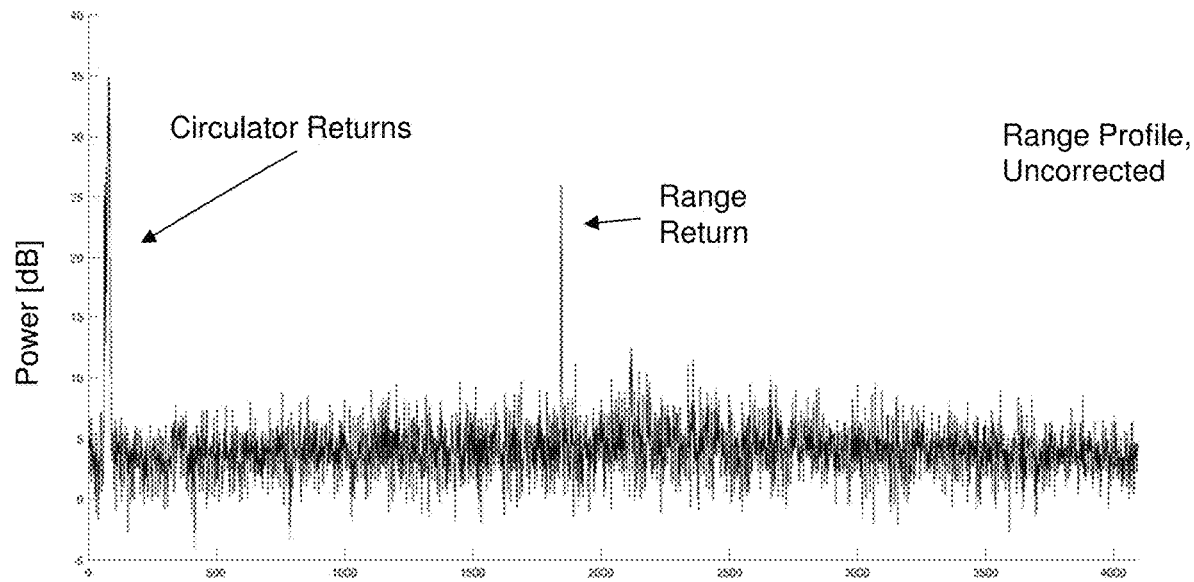
FIG. 10A through FIG. 10E are graphs that illustrate example range signals before and after corrections to remove returns from internal reflections, according to an embodiment.
Figure 10B:
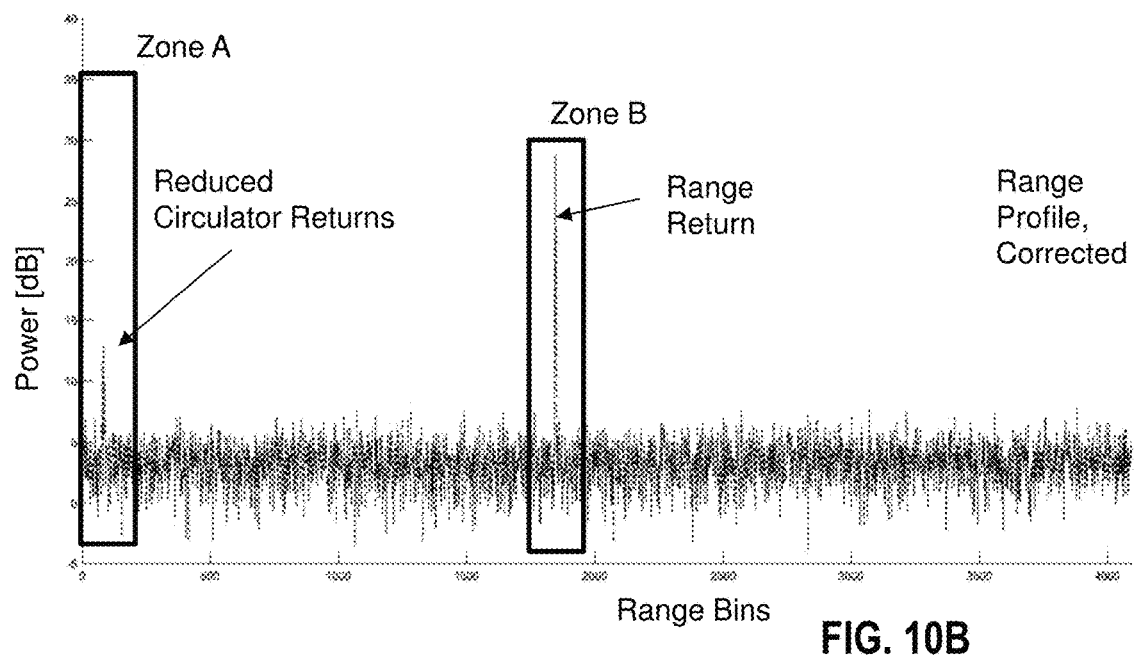
Figure 10C:
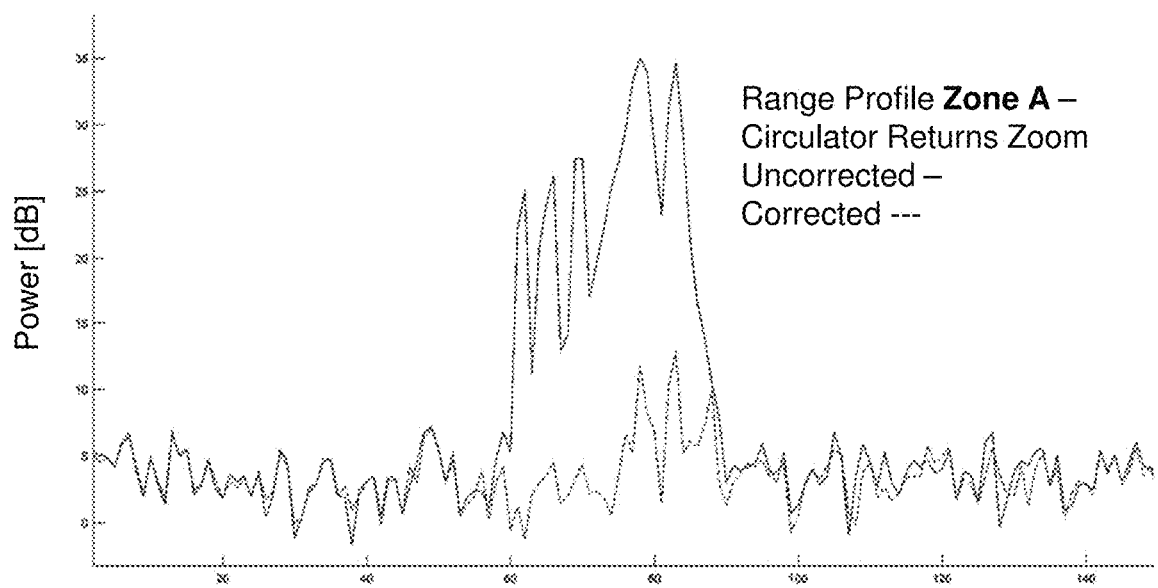
Figure 10D:
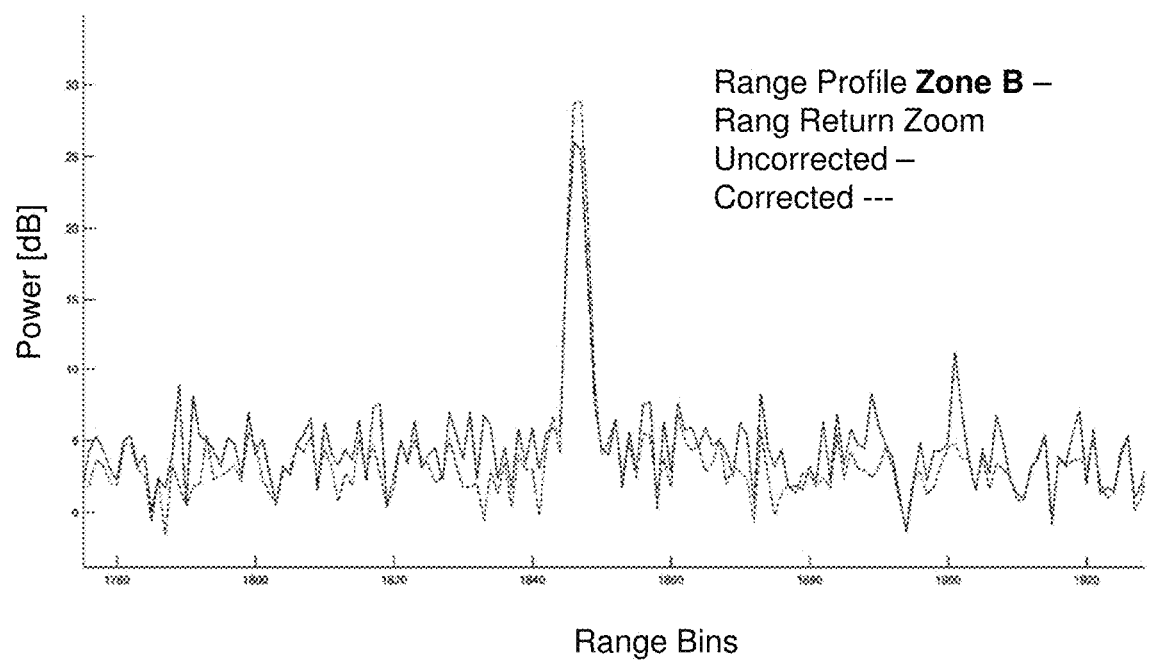

FIG. 10A through FIG. 10E are graphs that illustrate example range signals before and after corrections to remove returns from internal optics, according to an embodiment. In FIG. 10A, the horizontal axis indicates range bins in meters from zero to over 4000 m; and, the vertical axis indicates cross correlation power in decibels (dB, $\log(y/y_0)$ relative to reference $y_0$). The trace shows the correlation peaks before subtracting the average of P spots. A large peak appears about 100 m and a smaller peak at about 2000m. In FIG. 10B, the axes are the same, but the trace shows the correlation peaks after correction by subtracting the average of P=32 spots. The spurious peak at about 100 m due to internal optical components (here, a circulator used in place of scanning optics 322) is greatly reduced and the peak at about 2000 m due to an actual external object is somewhat enhanced. This is shown more clearly in FIG. 10C which expands the region of Zone A near the returns from the internal optical components, and in FIG. 10D which expands the region of Zone B near the actual returns from the external object. FIG. 10C shows a solid trace that indicates multiple spurious reflections between 60 and 90 meters, which are nearly completely removed in the dashed trace that indicates the corrected range profile. Clearly, optical back reflection is often made up of multiple reflections. For example, the circulator has several back reflecting surfaces which manifest as separate peaks in FIG. 10C uncorrected. FIG. 10D shows a solid trace that indicates an actual peak at about 1850 m, which is enhanced about 10% in the dashed trace that indicates the corrected range profile.

Figure 10E:
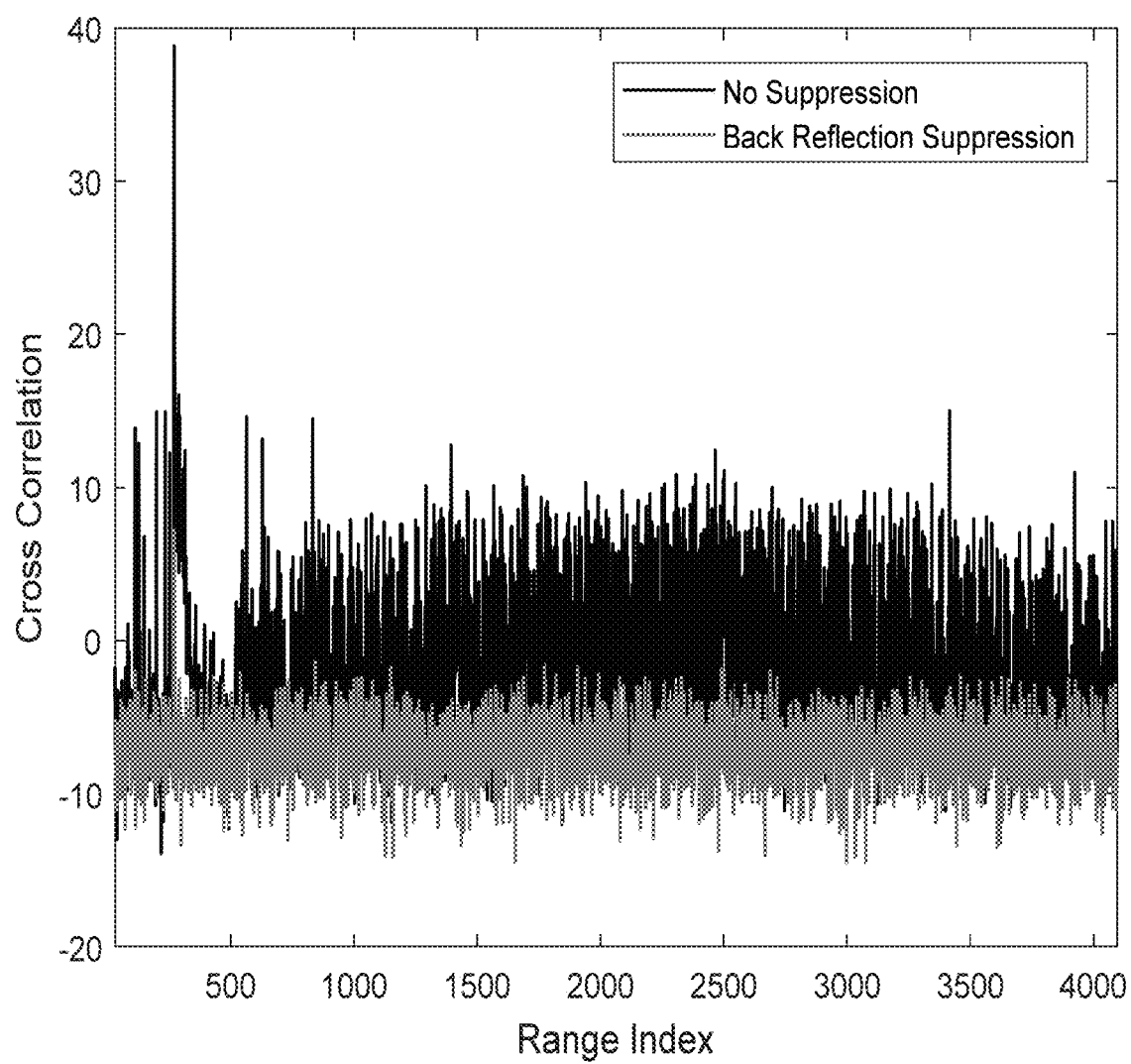

For example, in a monostatic detection system with a 99.99% anti-reflection coated optic and 1 mW of optical power, 100 nW of power will be back reflected to the detector. For a coherent system, this is a substantial amount of power—much more than a typical target return. Depending on the system and code used, this can cause an increase in the noise floor due to the inherent sidebands of the back reflected range measurement. FIG. 10E shows the contribution to cross correlation of internal reflections along a wide expanse of range bins from a range bin index of 0 to a range bin index of 4000. In the experimental data presented here, the black trace is an example of a noise floor elevated by the sidelobe structure of the strong return. The grey is noise floor after circulator subtraction—essentially shot noise limited. Specifically, before suppression, given by the dark trace, besides the peak at an index of about 150, there is a steady contribution to the cross correlation between −5 dB and +10 dB in all range bins out to index 4000. After suppression, given by the gray trace, the peak at an index of about 150 is well reduced; and, there is a reduced contribution to the cross correlation of less than −5 dB in all range bins out to index 4000.

4.7 Method for subtracting internal reflections using lasers that are not phase stable.

In general, the above internal reflection subtraction technique requires a laser which is frequency stable ($<\pi/10$ phase drift) over several (>25) measurements. While suitable for many embodiments, in some embodiments such small phase drift is not available. For example, in some embodiments, the laser 310 in FIG. 3 is a commercial coherent optical fiber communications laser (such as the micro integrated tunable laser assembly, "uITLA") that is stabilized using a feedback loop with a driver that introduces an optical frequency dither. The laser dither often goes over several hundred megahertz at a frequency of several hundred hertz. This can cause challenges relative to the internal reflection average subtraction techniques discussed above, because the phase may drift by >2π during a typical circulator averaging duration of 20 to 30 measurements used in some embodiments, or between 10 and 5000 measurements used in various other embodiments.

In various embodiments, the internal reflection average subtraction method is modified to take account of laser phase changes during the internal reflection averaging period. The phase sensitivity of coherent LIDAR systems can be leveraged to solve this problem. By tracking the optical phase of the back-reflection signals, phase corrections (e.g., multiplying by a unitary complex number) can be applied to signals prior to averaging so that they are in phase.

FIG. 11 is a flow chart that illustrates an example method for phase tracking internal reflections before subtraction, according to an embodiment. This method 1100 is computationally intensive but straight forward and effective. In this "long hand" method, the phase of the back-reflected signal peak is estimated after cross-correlation with the reference code (phase of the complex valued range peak in the cross-correlation). The back reflected peak occurs at a consistent location in the range profile (e.g., at a fixed range delay) that can be determined one-time in a calibration operation. Generally the peak is in the very short range bins, typically the first 100 or so range bins. It is also often the tallest, most consistent peak under normal scanner operation without back reflection subtraction. The phase at this peak is then removed from the time domain signal prior to averaging. Post-averaging, the back-reflected signal phase of a particular shot is re-introduced before the signal is subtracted from the original time domain signal vector. This method is a computationally intensive way to estimate the evolving phase.

Operations 901a through 905a are as described above, to configure the transceiver (operation 901a), prepare the phase code blocks (operation 903a), and illuminate the next spot with the transmitted optical signal (operation 905a). In operation 1107 a return signal is received; and, in some embodiments stored on a non-transitory computer-readable medium for further processing. In some embodiments, the return is a time series of complex values that is based on separate measurements of the in phase (I) and quadrature (Q) components of the return signal.

In operation 1111, the optical phase of the back reflected signal is determined. Operation 1111 includes computing the cross correlation (designated CC{a(t),b(t)} for two time series designated a(t) and b(t)) of the phase encoded signal, B(t) and the returned signal, $E_k$ of Equation 7b from the pth spot of the P spots to be averaged, designated $E_{kp}(t)$. The result is a range profile complex amplitude for spot p, $RP_p$, as a function of time lag corresponding range bin index, i, as given by Equation 13a.

$$RP_p(i) = CC\{B(t), E_{kp}(t)\} \quad (13a)$$

The back reflected peak in this profile is at index ibr and is given by the index of the maximum absolute value of the complex profile RP confined to the index range of internal reflections, from 0 to the largest index associated with internal reflections, designated IRmax, e.g., IRmax=100 in the data depicted in FIG. 10A. The index ibr is given by Equation 13b.

$$ibr = \text{Argmax}\{|RP_p(i)|\} \text{ for } i=1, IRmax \quad (13b).$$

As stated above, this can be in a one time calibration operation. The phase associated with this peak for the pth spot, designated $\phi l_p$, is a complex number given by Equation 13c.

$$\phi l_p = \text{Angle}\{RP_p(ibr)\} \quad (13c)$$

Where Angle{x} is a function that computes the four quadrant inverse tangent, basically the [−π, π] wrapped angle between the real and imaginary parts of the complex number x. As stated above, in some embodiments, there are multiple back reflections and not a single back reflected peak at short ranges. Since these are all at very similar ranges (and hence time delays), the phase change on the most prominent peak tracks with the others for small frequency dithers. Basically the phase drift on the different peaks (equivalent to the laser frequency, time delay product) is pretty small because the time delays to all those peaks are so similar. This could help explain why estimation and tracking of one peak leads to a good reduction of the entire circulator complex (as in FIG. 10E).

In operation 1113, the return signal is corrected in the time domain by the phase determined in operation 1111, as given by Equation 14a.

$$S_p(t) = E_{kp}(t) * \exp(-i * \phi l_p) \quad (14a)$$

This operation 1113 essentially makes the phase of the back reflected signal vector zero so that coherent averaging can proceed in phase. Note that the temporal lag of the code is unaffected—just the phase is changed. Note that in the previous approach, without phase correction before averaging described in method 900a, $S_p(t) = E_{kp}(t)$. In some embodiments, both the phase corrected signal Sp(t) and the phase correction are stored on a computer-readable medium for later retrieval. In some of these embodiments, the phase corrected signal Sp(t) and phase correction $\phi l_p$ are stored instead of the received signal $E_{kp}(t)$.

In operation 1115, the complex sum of the phase corrected signals and number n of signals summed is accumulated and stored in memory or a special register or on some other computer-readable medium as a time series of complex numbers. The summation is given by Equation 14b.

$$\text{SUM}_n(t) = \Sigma_{p=1}^n S_p(t) \quad (14b)$$

where n≤P is the number of phase corrected signals so far accumulated. In some embodiments, operation 1115 also divides the sum by the number of signals to compute the average signal after the n signals are combined, as given by Equation 14c.

$$AVE_n(t) = \frac{1}{n} \sum_{p=1}^{n} S_p(t) \quad (14c)$$

In other embodiments, the division is not done until the sum of Equation 14b has been accumulated for all P signals.

In operation 1117, it is determined whether the averaging period has been reached, e.g., whether n=P. After all P signals have been averaged, n=P, and the average of Equation 14c provides the time domain internal reflection subtraction signal $S_S(t)$ given by Equation 12a. This equivalence is expressed in Equation 14d.

$$S_S(t) = AVE_P(t) \quad (14d).$$

In some embodiments, the averaging can be done with an exponential decay based on time to give more weight to more recent shots. If P signals have not been accumulated then control passes back to operation 905a to illuminate the next spot. Otherwise, control passes to operation 1131.

In operation 1131, the next time domain signal to be corrected for internal reflections is received. In some embodiments, this signal is one of the P signals in an averaging ensemble that were phase corrected and averaged above. In other embodiments, this signal is a different signal received before or after the signals in the averaging ensemble. The returned signals in the averaging ensemble and the returned signal to be corrected for internal reflection constitute a first plurality of returned signals. The averaging ensemble is then a subset of the first plurality of signals. The first plurality and subset are identical if the returned signal to be corrected for internal reflections is among the averaging ensemble.

In operation 1133, the phase corrected signal Sp(t) stored during the averaging period is multiplied by the corresponding phase correction $\phi1_p$ also stored during the averaging period to restore the original received signal $E_{kp}(t)$ represented by the inverse of Equation 14a. This restores the actual phase lag due to the k objects illuminated. If $E_{kp}(t)$ was stored in operation 1107, then operation 1133 can be omitted.

In operation 1135, the phase corrected internal reflection subtraction signal $S_S(t)$ is subtracted from the received signal $E_k(t)$ (whether among the $E_{kp}(t)$ used in the averaging ensemble of P signals or some other $E_k(t)$ outside the averaging ensemble), in the time domain to produce the internal reflection corrected signal $S_{PC}(t)$ that is used as the returned signal S(t) in subsequent processing. This correction is expressed in Equation 9 that is an improvement over Equation 12b because here $S_S(t)$ is a phase corrected average.

$$S(t)=S_{PC}(t)=E_k(t)-S_S(t) \tag{15}$$

In operation 1137, the corrected return signal S(t0 is used in subsequent processing, e.g., to determine the range, or any Doppler shift, or any quantities derived form these, or contribute to some application that involves many such measurements, such as for object identification, mapping, or navigation, among others, or some combination.

In operation 1139 it is determined whether there is another returned signal in the averaging ensemble to correct for internal reflections. If so, control passes back to operation 1131. If not, control passes to operation 1141. In some embodiments, the returned signal to be corrected for internal reflections is outside the averaging ensemble and operation 1139 is omitted and control passes directly from operation 1137 to operation 1141.

In operation 1141, it is determined if more measurements are being made. If so, control passes back to operation 905a to illuminate the next spot. If not, the process ends.

In a system that is not leveraging I/Q detection, the back-reflected signal will still demonstrate amplitude oscillations rather than phase oscillations as the laser dithers. Strategies are employed to track the amplitude evolution AIp as the laser dithers and this amplitude evolution is then corrected for each return prior to averaging. A basic strategy is to track the maximum back reflected peak value observed over some number of shots. A 'phase' is then calculated per each shot by comparing the back reflected peak in that shot to the held maximum. Subsequent operations follow very similarly to the I-Q approach where the amplitude of a given shot is normalized (instead of phased) prior to averaging. Then the shots are averaged. The back reflected signal estimate (which is subtracted) is then this average times the amplitude of the given shot.

The correction is applied as given in Equation 10a.

$$S_p(t)=E_{kp}(t)/AI_p \tag{16a}$$

The estimated signal is then amplitude scaled for the specific shot before digital removal as given by Equation 16b.

$$S(t)=S_{PC}(t)=AIp*E_{kp}(t)-S_S(t) \tag{16b}$$

Figure 12:
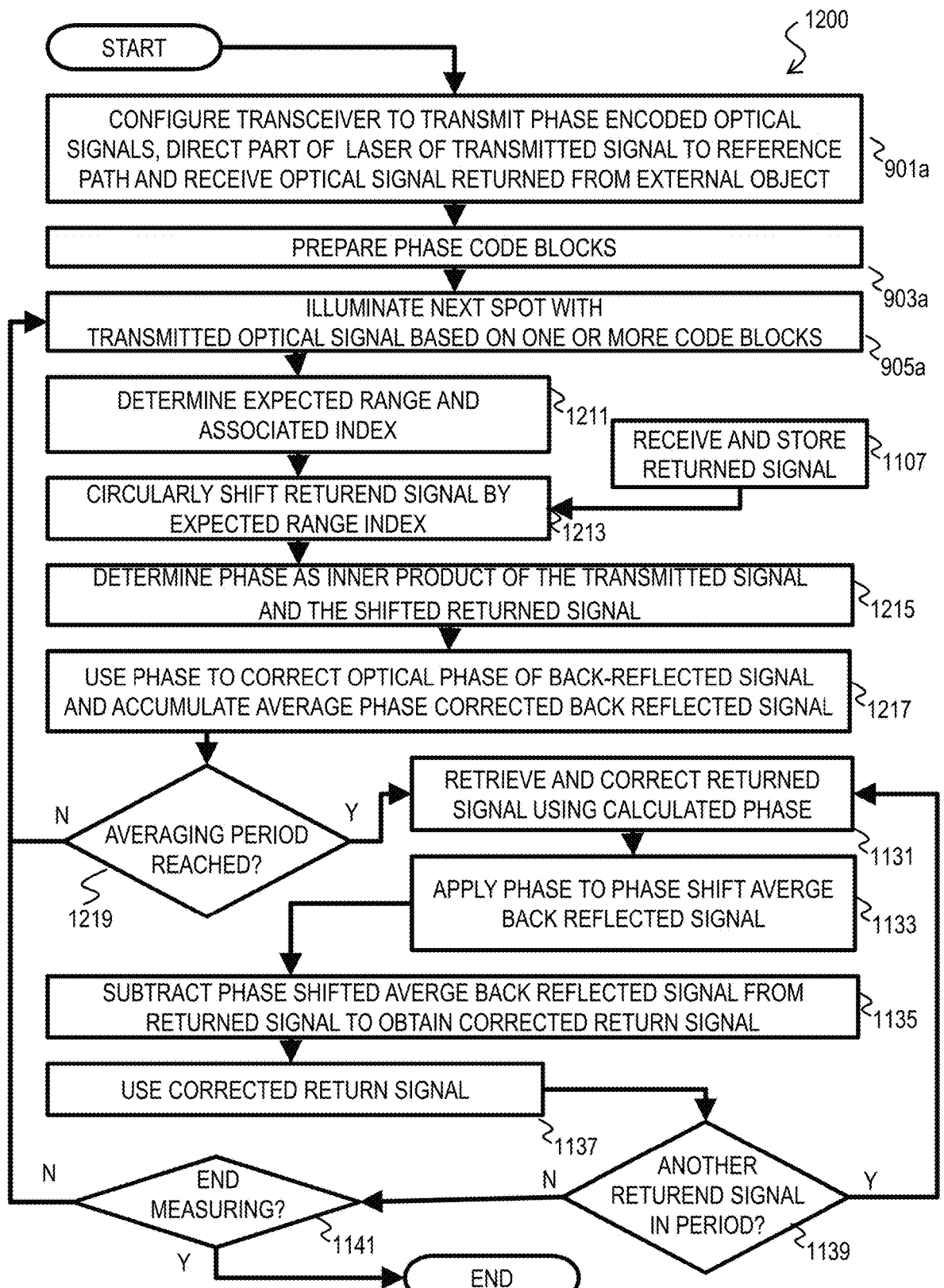
FIG. 12 is a flow chart that illustrates an example method for phase tracking internal reflections before subtraction, according to a different embodiment.

FIG. 12 is a flow chart that illustrates an example method for phase tracking internal reflections before subtraction, according to a different embodiment. The phase can be efficiently measured by calculating the inner product of the transmitted code and received signal circularly shifted by the expected range index of the back-reflected signal. The inner product will compute the same amplitude and phase result as the full cross correlation but only at the range bin of interest. This method 1200 saves many computations. From this phase calculation, the received signal is phase corrected in the time domain. The corrected time domain signal is then averaged with other phase-corrected temporal measurements. This averaged temporal signal will be used as the back-reflected signal to be subtracted from future temporal measurements as above.

Operations 901a through 905a are as described above, to configure the transceiver (operation 901a), prepare the phase code blocks (operation 903a), and illuminate the next spot with the transmitted optical signal (operation 905a). In operation 1107 a return signal is received; and, in some embodiments stored on a non-transitory computer-readable medium for further processing.

In method 1200 as in method 1100 of FIG. 11, the optical phase of the back reflected signal is determined. However, unlike method 1100, the full cross correlation of the phase encoded signal B(t) and the returned signal $E_{kp}(t)$ is NOT computed for multiple time lags and associated range indices. Instead, a dot product is computed for a single time lag with a single associated time range index.

Thus, in operation 1211, the expected range (and associated time lag and range index) is determined for the back reflected peak. For example, based on experimental data or a single prior cross correlation, it is known that the peak of the internal reflections occurs at a particular range and its corresponding range index, say ibr. In this example, operation 1211 comprises just retrieving the value of ibr from storage or any other method of receiving this data. Any method may be used to receive or retrieve this value, including retrieving it as a constant in the program code, retrieving from a data field on a local or remote computer-readable medium, in a database or flat file, either in response to a query message or unsolicited.

In operation 1213 the returned signal is circularly shifted by the expected range index to provided shifted return $Eshift_{kp}(t)$, as given by Equation 17a.

$$Eshift_{kp}(t)=\text{CIRCSHIFT}\{E_{kp}(t),ibr\} \tag{17a}$$

Where CIRCSHIFT{x, m} indicates a circular shift function of the time series x by the integer m. In a circular shift, any time series element shifted off one end of a set of values is added to the other end of the set of values. This is an exceptionally efficient operation to perform on a processor.

In operation 1215 the dot product between the shifted return and the phase code is computed to provide the range profile entry at the index ibr, as expressed in Equation 17b.

$$RP_p(ibr)=B(t) \cdot Eshift_{kp}(t) \tag{17b}$$

In operation 1215, the phase of this entry is computed. The phase associated with this range index for the pth spot, designated $\phi1_p$, is a complex number given by Equation 13c, as described above.

In operation 1217, the return signal is corrected in the time domain by the phase determined in operation 1215, as given by Equation 14a, described above, and a sum or average is accumulated over P returned signals as described above with respect to Equations 14b and 14c. In some embodiments, both the phase corrected signal Sp(t) and the phase correction are stored on a computer-readable medium for later retrieval. In some of these embodiments, the phase corrected signal Sp(t) and phase correction $\phi1_p$ are stored instead of the received signal $E_{kp}(t)$. Also in operation 1217, the complex sum of the phase corrected signals and number n of signals summed is accumulated and stored in memory or a special register or on some other computer-readable medium. The summation is given by Equation 14a or Equation 14b, described above. In some embodiments, operation 1217 also divides the sum by the number of signals to compute the average signal after the n signals are combined, as given by Equation 14c. In other embodiments, the division is not done until the sum of Equation 14b has been accumulated for all P signals.

In operation 1119, it is determined whether the averaging period has been reached, e.g., whether n=P. After all P signals have been averaged, n=P, and the average of Equation 14c provides the time domain internal reflection subtraction signal $S_S(t)$ given by Equation 12a. This equivalence is expressed in Equation 14d. If P signals have not been accumulated then control passes back to operation 905*a* to illuminate the next spot. Otherwise, control passes to operation 1131. Operations 1131 through 1141 are as described above for method 1100 in FIG. 11.

Figure 13:
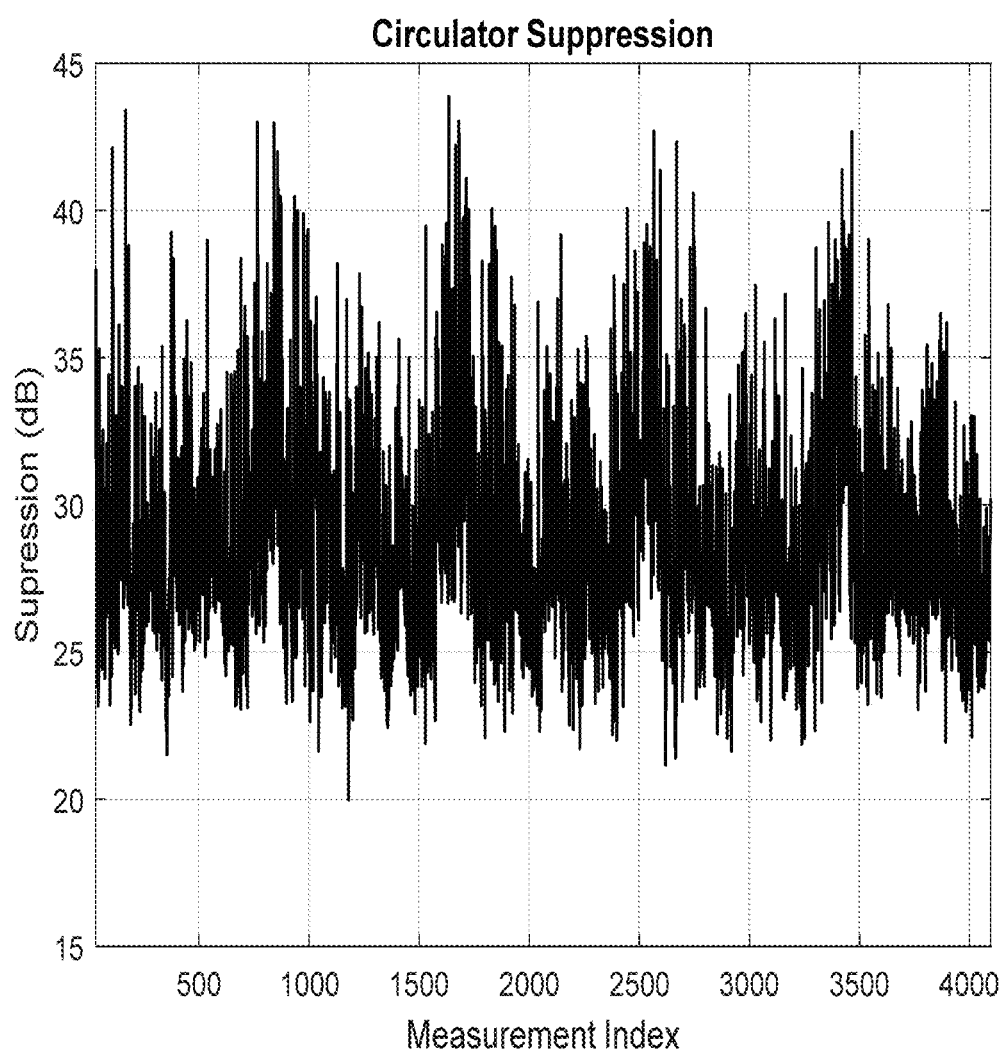
FIG. 13 is a graph that illustrates example internal reflection subtraction, according to an embodiment.

FIG. 13 is a graph that illustrates example internal reflection subtraction, according to an embodiment. The horizontal axis indicates range index i (called "measurement index" in the figures). The vertical axis indicates suppression in dB, which is a measure of the decrease in cross correlation after subtraction of $S_S(t)$ computed as in method 700. Suppression at each index i is given by Equation 18.

$$\text{Suppression}(i) = \log\{CC\{B(t), E_{kp}(t)\}/CC\{B(t), E_{kp}(t) - S_S(t)\}\} \quad (18)$$

This method is very effective on experimental data with a dithering laser as shown in FIG. 13. The suppression is always >20 dB and routinely >30 dB. The target for this operation is often for a noise floor of about 15 dB to 20 dB.

In some embodiments, the code is subdivided into sections (say 256 sample chunks) before performing one or more of the above operations (e.g., estimating and tracking phase with the inner product trick. SNR permitting, the phase evolution (and hence the frequency of the laser) can be tracked digitally at faster timescales. This can improve phase tracking circulator subtraction a bit.

5. Computational Hardware Overview

Figure 14:
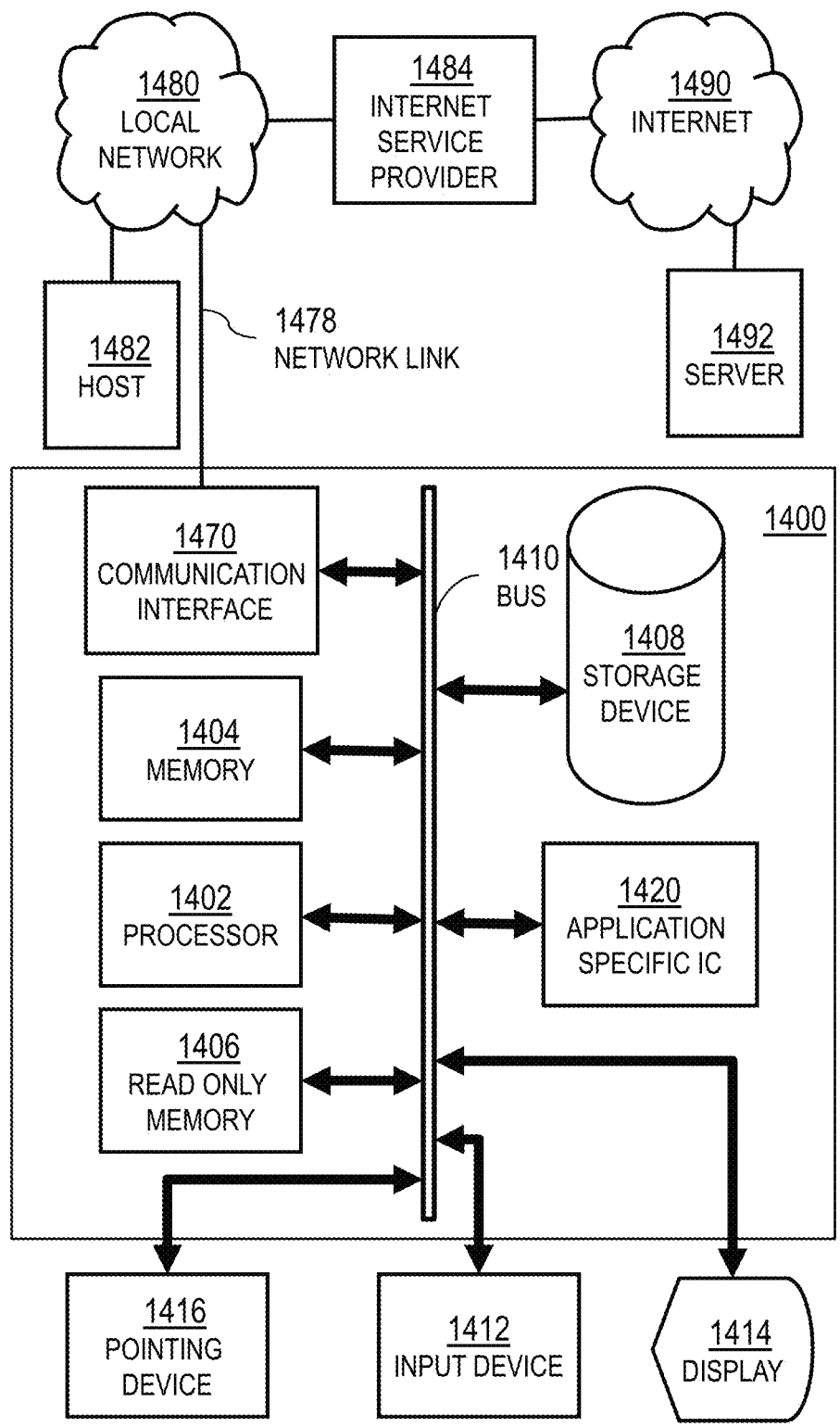
FIG. 14 is a block diagram that illustrates a computer system upon which an embodiment of the invention may be implemented.

FIG. 14 is a block diagram that illustrates a computer system 1400 upon which an embodiment of the invention may be implemented. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more operations of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitutes computer instructions.

Computer system 1400 also includes a memory 1404 coupled to bus 1410. The memory 1404, such as a random access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406 or other static storage device coupled to the bus 1410 for storing static information, including instructions, that is not changed by the computer system 1400. Also coupled to bus 1410 is a non-volatile (persistent) storage device 1408, such as a magnetic disk or optical disk, for storing information, including instructions, that persists even when the computer system 1400 is turned off or otherwise loses power.

Information, including instructions, is provided to the bus 1410 for use by the processor from an external input device 1412, such as a keyboard containing alphanumeric keys operated by a human user, or a sensor. A sensor detects conditions in its vicinity and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), for presenting images, and a pointing device 1416, such as a mouse or a trackball or cursor direction keys, for controlling a position of a small cursor image presented on the display 1414 and issuing commands associated with graphical elements presented on the display 1414.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1470 sends and receives electrical, acoustic or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible media includes one or both of processor instructions on a computer-readable storage media and special purpose hardware, such as ASIC 1420.

Network link 1478 typically provides information communication through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490. A computer called a server 1492 connected to the Internet provides a service in response to information received over the Internet. For example, server 1492 provides information representing video data for presentation at display 1414.

The invention is related to the use of computer system 1400 for implementing the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method operations described herein. In alternative embodiments, hardware, such as application specific integrated circuit 1420, may be used in place of or in combination with software to implement the invention. Thus, embodiments of the invention are not limited to any specific combination of hardware and software.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1402 as it is received, or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

Figure 15:
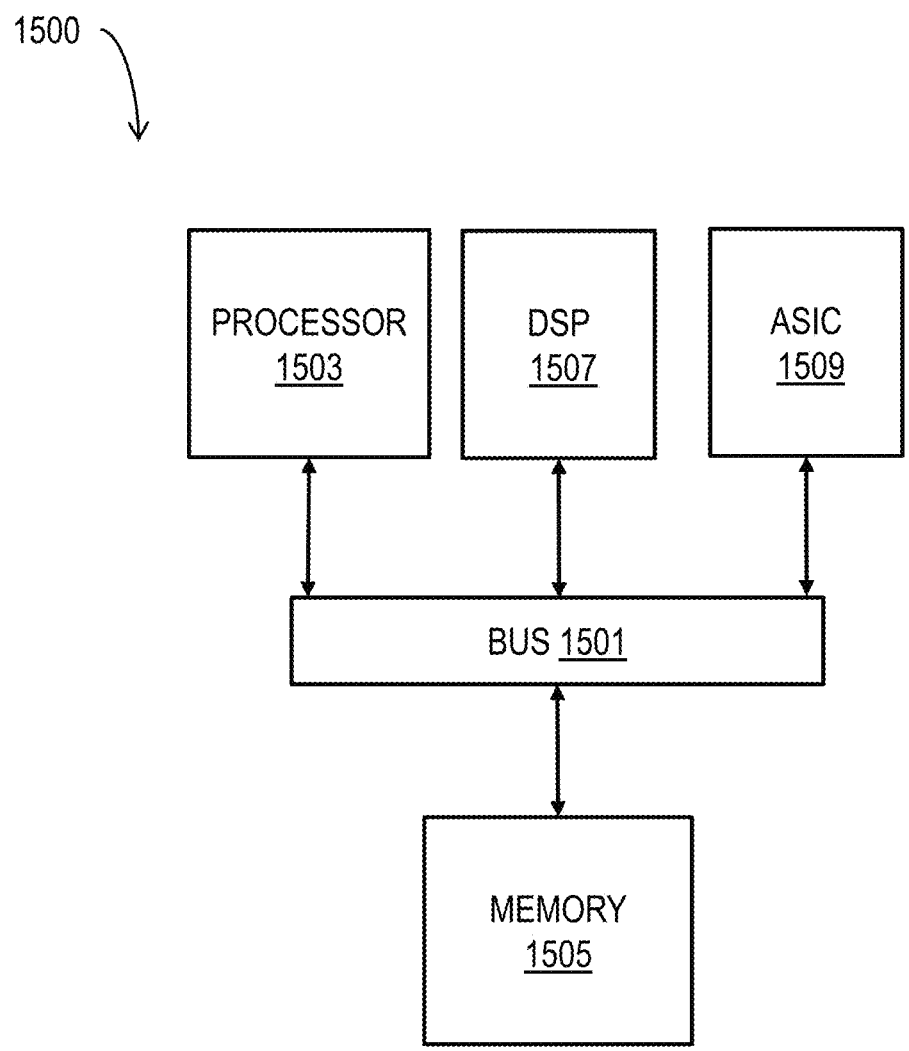
FIG. 15 illustrates a chip set upon which an embodiment of the invention may be implemented.

FIG. 15 illustrates a chip set upon which an embodiment of the invention may be implemented. Chip set 1500 is programmed to perform one or more operations of a method described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more operations of a method described herein.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform one or more operations of a method described herein. The memory 1505 also stores the data associated with or generated by the execution of one or more operations of the methods described herein.

6. Alterations, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or operation or group of items, elements or operations but not the exclusion of any other item, element or operation or group of items, elements or operations. Furthermore, the indefinite article "a" or "an" is meant to indicate one or more of the item, element or operation modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described herein in the context of binary, π/2 (90 degree) phase encoding at a radio frequency (RF) signal modulated onto an optical signal. However, embodiments are not limited to these contexts. For example, in some embodiments, other phase encoding is used, with different phase differences (e.g., 30, 60, or 180 degrees) or encoding with 3 or more different phases. In other embodiments, other ranging modulation formats use time separated in-phase and quadrature local oscillator (LO) signals as a reference signal. Such modulation formats include but are not limited to "on off keying", "frequency shift keying", and "noise" waveforms. Embodiments are described in the context of a single optical beam and its return on a single detector or pair of detectors, which in other embodiments can then be scanned using any known scanning means, such as linear stepping or rotating optical components or with arrays of transmitters or arrays of detectors or pairs of detectors.

What is claimed is:

1. A system comprising:
 a laser that provides a plurality of optical signals;
 a modulator that modulates the plurality of optical signals from the laser to generate a plurality of modulated optical signals;
 an optical coupler that generates a plurality of reference optical signals, each associated with a respective optical signal of the plurality of optical signals from the laser, transmits the plurality of modulated optical signals into free space, and receives a plurality of returned optical signals responsive to transmitting the plurality of modulated optical signals into the free space;
 an optical mixer that mixes each of the plurality of returned optical signals with a respective reference optical signal of the plurality of reference optical signals to generate a respective mixed optical signal of a plurality of mixed optical signals;

an optical detector that detects each mixed optical signal of the plurality of mixed optical signals to generate a respective electrical signal of a plurality of electrical signals; and a processor that:
- determines a first signal by adjusting a parameter of a first electrical signal of the plurality of electrical signals;
- determines a second signal by adjusting a parameter of a second electrical signal of the plurality of electrical signals;
- determines an internal reflection signal indicative of an internal reflection of one or more optical components based on the first signal and the second signal;
- determines a third signal by adjusting a third electrical signal of the plurality of electrical signals using the internal reflection signal; and
- operates a vehicle based on the third signal.

2. The system of claim 1, wherein the parameter of the first electrical signal and the parameter of the second electrical signal are each selected from at least one of a phase, an amplitude, a frequency, or an angular frequency.

3. The system of claim 1, wherein the modulator modulates the plurality of reference optical signals prior to mixing each of the returned optical signals with the respective reference optical signal of the plurality of reference optical signals.

4. The system of claim 1, wherein the plurality of optical signals are modulated based on a sequence of phases of each respective optical signal.

5. The system of claim 4, wherein the optical coupler transmits the plurality of modulated optical signals into free space for each of a first plurality of measurements, and receives each of the returned optical signals for each of the first plurality of measurements.

6. The system of claim 5, wherein the optical mixer generates the plurality of mixed optical signals for each of the first plurality of measurements, wherein the optical detector generates the respective electrical signal of the plurality of electrical signals for each of the first plurality of measurements.

7. The system of claim 6, wherein the parameter of the first electrical signal and the second electrical signal each comprise a phase of the internal reflection signal for each of the first plurality of measurements.

8. The system of claim 7, wherein the processor determines a parameter of the internal reflection signal based on a dot product measurement.

9. The system of claim 7, wherein the processor determines the parameter of the internal reflection signal by:
- determining an average over a second plurality of measurements including one or more measurements of the first plurality of measurements of the electrical signal, wherein the average is determined based at least in part on the phase of the internal reflection signal for each of the second plurality of measurements; and
- determining a corrected return signal based at least in part on (i) the average over the second plurality of measurements and (ii) the electrical signal for at least one of the first plurality of measurements.

10. The system of claim 9, wherein the processor operates the vehicle based on the corrected return signal.

11. The method of claim 1, wherein the plurality of optical signals are modulated based on a sequence of phases of each respective optical signal.

12. The method of claim 11, wherein transmitting the modulated optical signal toward the object comprises transmitting the plurality of modulated optical signals for each of a first plurality of measurements, wherein receiving the plurality of returned optical signals comprises receiving each of the returned optical signals for each of the first plurality of measurements.

13. The method of claim 12, wherein the plurality of mixed optical signals are generated for each of the first plurality of measurements, wherein the respective electrical signal of the plurality of electrical signals is generated for each of the first plurality of measurements.

14. The method of claim 13, wherein the parameter of the first electrical signal and the second electrical signal each comprises a phase of the internal reflection signal for each of the first plurality of measurements.

15. The method of claim 14, wherein determining a parameter of the internal reflection signal further comprises determining the parameter of the internal reflection signal based on a dot product measurement.

16. The method of claim 14, wherein determining the parameter of the internal reflection signal comprises:
- determining an average over a second plurality of including one or more measurements of the first plurality of measurements of the electrical signal, wherein the average is determined based at least in part on the phase of the internal reflection for each of the second plurality of measurements; and
- determining a corrected return signal based at least in part on (i) the average over the second plurality of measurements and (ii) the electrical signal for at least one of the first plurality of measurements.

17. The method of claim 16, wherein operating the vehicle comprises operating the vehicle based on the corrected return signal.

18. A method comprising:
- modulating a plurality of optical signals from a laser to generate a plurality of modulated optical signals;
- transmitting the plurality of modulated optical signals into free space;
- receiving, responsive to transmitting the plurality of modulated optical signals, a plurality of returned optical signals;
- mixing each of the returned optical signals with a respective reference optical signal of the plurality of reference optical signals to generate a respective mixed optical signal of a plurality of mixed optical signals;
- detecting each mixed optical signal of the plurality of mixed optical signals to generate a respective electrical signal of the plurality of electrical signals;
- determining a first signal by adjusting a parameter of a first electrical signal of the plurality of electrical signals;
- determining a second signal by adjusting a parameter of a second electrical signal of the plurality of electrical signals;
- determining an internal reflection signal indicative of an internal reflection of one or more optical components based on the first signal and the second signal;
- determining a third signal by adjusting a third electrical signal of the plurality of electrical signals using the internal reflection signal; and
- operating, based on the third signal, a vehicle.

19. The method of claim 1, wherein the parameter of the first electrical signal and the parameter of the second electrical signal are each selected from at least one of a phase, an amplitude, a frequency, or an angular frequency.

20. The method of claim 1, further comprising modulating the plurality of reference optical signals prior to mixing each of the returned optical signals with the respective reference optical signal of the plurality of reference optical signals.

* * * * *